(12) United States Patent
Ishii

(10) Patent No.: US 8,676,039 B2
(45) Date of Patent: Mar. 18, 2014

(54) RECORDING APPARATUS, CONTROL METHOD THEREOF, AND NON-TRANSITORY COMPUTER-READABLE STORAGE MEDIUM

(75) Inventor: Yoshiki Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 12/237,064

(22) Filed: Sep. 24, 2008

(65) Prior Publication Data

US 2009/0097828 A1    Apr. 16, 2009

(30) Foreign Application Priority Data

Oct. 10, 2007    (JP) ................. 2007-264968

(51) Int. Cl.
*H04N 5/92*    (2006.01)

(52) U.S. Cl.
USPC ........................... 386/326; 386/333

(58) Field of Classification Search
USPC ........................................... 386/326
See application file for complete search history.

(56) References Cited

U.S. PATENT DOCUMENTS

| | | | |
|---|---|---|---|
| 2004/0131336 A1* | 7/2004 | Matsuno et al. ................ | 386/95 |
| 2005/0083414 A1* | 4/2005 | Hidaka et al. ................ | 348/220.1 |
| 2006/0077483 A1* | 4/2006 | Yoshida .......................... | 358/496 |
| 2006/0077484 A1* | 4/2006 | Toyoda et al. ................. | 358/498 |
| 2007/0140650 A1* | 6/2007 | Suzuki ............................ | 386/83 |
| 2007/0201839 A1* | 8/2007 | Murakami ..................... | 386/125 |

FOREIGN PATENT DOCUMENTS

| | | |
|---|---|---|
| JP | 2004-187278 A | 7/2004 |
| JP | 2004-201170 | 7/2004 |
| JP | 2007-259095 A | 10/2007 |
| WO | 2005-122173 A1 | 12/2005 |
| WO | 2007-111208 A1 | 10/2007 |

OTHER PUBLICATIONS

The above references were cited in a Oct. 14, 2011 Japanese Office Action, of which is enclosed without an English Translation, that issued in Japanese Patent Application No. 2007-264968.

* cited by examiner

*Primary Examiner* — Peter Shaw
*Assistant Examiner* — Ali Shayanfar
(74) *Attorney, Agent, or Firm* — Cowan, Liebowitz & Latman, P.C.

(57) ABSTRACT

There is provided an information processing apparatus which generates, for an image reproducing apparatus, an application program that is executable by the image reproducing apparatus, the image reproducing apparatus operating under a basic program that is capable of executing an application program recorded in a first area of a recording medium but that is incapable of reproducing image data that is recorded in a second area of the recording medium, and the information processing apparatus comprising: a program generation unit which generates a reproducing program for the image reproducing apparatus to reproduce the image data recorded in the second area of the recording medium, as an application program executable by the image reproducing apparatus; and a recording unit which records the reproducing program generated by the program generation unit into the first area of the recording medium.

13 Claims, 18 Drawing Sheets

RECORDING APPARATUS, CONTROL METHOD THEREOF, AND NON-TRANSITORY COMPUTER-READABLE STORAGE MEDIUM

BACKGROUND OF THE INVENTION

1. Field of the Invention

The present invention relates to an information processing apparatus that generates an application program executable by an image reproducing apparatus, a control method for the information processing apparatus, and a program.

2. Description of the Related Art

Conventional video cameras used for capturing moving image generally use tape media with high recording capacity as their recording media due to the large size of the moving image data. However, due to recent advances in moving image data compression techniques, as well as a trend toward higher capacities in optical discs, magnetic discs, semiconductor memories, and so on, video cameras that use such discs and memories as their recording media are becoming common.

As opposed to conventional tape media, media such as optical discs, magnetic discs, and semiconductor memories enable random access. Accordingly, not only has the searchability of moving image captured by video cameras improved dramatically, but it has also become easier to record still image data along with moving image data on the same medium.

For example, video cameras that record both moving image data and still image data onto disc-type media such as a DVD record the moving image data and still image data based on their respective individual standards.

The DVD Video standard, DVD VR standard, and so on are often used as the standard for moving image data. This makes it possible to reproduce moving image data that has been recorded by a video camera onto a DVD using an image reproducing apparatus, such as a DVD-Video player, which has become a common item in today's households. Meanwhile, the Design Rule for Camera File System (DCF) standard, which is a standard for recording still image data using a digital still camera, is often used as the standard for still image data. This makes it possible to collectively handle the recording media for digital still cameras and the recording media for video cameras using, for example, a personal computer (PC).

Still image data recorded onto a disc in accordance with the DCF standard is not compliant with standards for moving image data, such as the DVD Video standard. For this reason, normal video players cannot reproduce such still image data; therefore, only some video players, whose functionality has been proprietarily expanded by the maker, have been able to reproduce such data.

A technique is known in which still image data based on the DCF standard is converted into moving image frame data and recorded onto a disc as moving image data in order to enable the still image data to be viewed using a normal video player (for example, see Japanese Patent Laid-Open No. 2004-201170). According to this technique, still images can be displayed as a slideshow by reproducing the moving image data generated from the still image data.

FIG. 17 is a function block diagram illustrating the configuration of an information processing apparatus 1700 that generates and records moving image data based on still image data. Moving image data recorded in accordance with a moving image data standard is stored in a recording medium 1707 along with still image data recorded in accordance with a still image standard. A medium reproduction unit 1701 reads out the still image data from the recording medium 1707 in accordance with control performed by a system controller 1703, and supplies the still image data to a still image information obtaining unit 1702. The still image information obtaining unit 1702 obtains, from the supplied still image data, information such as the path of the still image data in the recording medium 1707, the total number of still images, and so on (still image recording information). Based on the still image recording information, the system controller 1703 controls a slideshow moving image generation unit 1717 and a moving image encoding unit 1718, generating moving image data in which the still image data is arranged as moving image frame data (in other words, a slideshow moving image).

To be more specific, the slideshow moving image generation unit 1717 sequentially receives the still image data from the medium reproduction unit 1701, reduces the still image data to the frame size of the moving image, and supplies the resultant to the moving image encoding unit 1718. In accordance with control performed by the system controller 1703, the moving image encoding unit 1718 sequentially encodes the still image data supplied by the slideshow moving image generation unit 1717, generating a slideshow moving image in which the still image data is arranged as frame data.

The slideshow moving image generally has still image data encoded as MPEG-2 I pictures as frame data. The speed of the slideshow is controlled by controlling the presentation time of the I pictures. The slideshow moving image encoded by the moving image encoding unit 1718 is multiplexed with audio data and the like using a multiplexer 1719, and is recorded by a medium recording unit 1706 onto the recording medium 1707 as a recorded moving image stream.

FIG. 18 is a diagram illustrating an example of the file directory structure of the recording medium 1707 onto which the slideshow moving image described with reference to FIG. 17 is recorded. The recording medium 1707 has a root directory 1801. The root directory 1801 has two directories: a moving image area directory 1802 in which is recorded data in accordance with a moving image data standard; and a still image area directory 1803 in which is recorded data in accordance with a still image data standard. A normal video player as described earlier can reproduce the data within the moving image area directory 1802, but cannot reproduce the data within the still image area directory 1803.

The moving image area directory 1802 has moving image management data 1804 in which is recorded information for managing the moving image data, and a playlist folder 1805 in which are stored playlists 1810 to 1812 for controlling the reproduction of the moving image data. The moving image area directory 1802 also has a moving image folder 1806 in which is stored moving image data 1813 to 1815.

The still image area directory 1803 has a still image folder 1809 in which is stored still image data 1816 to 1818 in accordance with a still image data standard.

Slideshow moving image data 1826 generated by the information processing apparatus 1700 as described earlier has the still image data 1816 to 1818 as frame data, and is stored in the moving image folder 1806. Furthermore, a slideshow playlist 1825, serving as a playlist for controlling the reproduction of the slideshow moving image data 1826, is recorded in the playlist folder 1805.

However, when generating a slideshow moving image, the still image data is reduced in size according to the standard supported by the normal video player, reducing the number of pixels and therefore decreasing the quality of the still image. Accordingly, with the conventional technique, a user can only view still images at a reduced quality, even if the still images were captured with a digital still camera or video camera at high resolution.

SUMMARY OF THE INVENTION

Having been conceived in light of such circumstances, it is a characteristic of the present invention to provide a technique that enables an image reproducing apparatus to reproduce image data recorded in accordance with a standard the image reproducing apparatus cannot reproduce, while suppressing a decrease in image quality.

According to an aspect of the present invention, there is provided an information processing apparatus which generates, for an image reproducing apparatus, an application program that is executable by the image reproducing apparatus, the image reproducing apparatus operating under a basic program that is capable of executing an application program recorded in a first area of a recording medium but that is incapable of reproducing image data that is recorded in a second area of the recording medium, and the information processing apparatus comprising:

a program generation unit which generates a reproducing program for the image reproducing apparatus to reproduce the image data recorded in the second area of the recording medium, as an application program executable by the image reproducing apparatus; and a recording unit which records the reproducing program generated by the program generation unit into the first area of the recording medium.

According to another aspect of the present invention, there is provided an information processing apparatus which generates, for an image reproducing apparatus, an application program that is executable by the image reproducing apparatus, the image reproducing apparatus operating under a basic program that is capable of executing an application program recorded in a first area of a recording medium but that is incapable of reproducing image data that is recorded in a second area of the recording medium, and the information processing apparatus comprising:

an obtaining unit which obtains image data;

a program generation unit which generates a reproducing program for the image reproducing apparatus to reproduce the obtained image data, as an application program executable by the image reproducing apparatus; and a recording unit which records the obtained image data into the first area or the second area of the recording medium, and records the reproducing program generated by the program generation unit into the first area of the recording medium.

According to yet another aspect of the present invention, there is provided a control method for an information processing apparatus which generates, for an image reproducing apparatus, an application program that is executable by the image reproducing apparatus, the image reproducing apparatus operating under a basic program that is capable of executing an application program recorded in a first area of a recording medium but that is incapable of reproducing image data that is recorded in a second area of the recording medium, and the method comprising:

generating a reproducing program for the image reproducing apparatus to reproduce the image data recorded in the second area of the recording medium, as an application program executable by the image reproducing apparatus; and recording the reproducing program generated by the program generation unit into the first area of the recording medium.

According to another aspect of the present invention, there is provided a control method for an information processing apparatus which generates, for the image reproducing apparatus, an application program that is executable by the image reproducing apparatus, the image reproducing apparatus operating under a basic program that is capable of executing an application program recorded in a first area of a recording medium but that is incapable of reproducing image data that is recorded in a second area of the recording medium, the method comprising:

obtaining image data;

generating a reproducing program for the image reproducing apparatus to reproduce the obtained image data, as an application program executable by the image reproducing apparatus; and recording the obtained image data into the first area or the second area of the recording medium, and recording the reproducing program generated by the program generation unit into the first area of the recording medium.

According to yet another aspect of the present invention, there is provided a computer program stored in a computer-readable storage medium, the program causing an information processing apparatus, which generates, for an image reproducing apparatus, an application program that is executable by the image reproducing apparatus, the image reproducing apparatus operating under a basic program that is capable of executing an application program recorded in a first area of a recording medium but that is incapable of reproducing image data that is recorded in a second area of the recording medium, to function as:

a program generation unit which generates a reproducing program for the image reproducing apparatus to reproduce the image data recorded in the second area of the recording medium, as an application program executable by the image reproducing apparatus; and a recording unit which records the reproducing program generated by the program generation unit into the first area of the recording medium.

According to another aspect of the present invention, there is provided a computer program stored in a computer-readable storage medium, the program causing an information processing apparatus, which generates, for an image reproducing apparatus, an application program that is executable by the image reproducing apparatus, the image reproducing apparatus operating under a basic program that is capable of executing an application program recorded in a first area of a recording medium but that is incapable of reproducing image data that is recorded in a second area of the recording medium, to function as:

an obtaining unit which obtains image data;

a program generation unit which generates a reproducing program for the image reproducing apparatus to reproduce the obtained image data, as an application program executable by the image reproducing apparatus; and a recording unit which records the obtained image data into the first area or the second area of the recording medium, and records the reproducing program generated by the program generation unit into the first area of the recording medium.

Further features of the present invention will become apparent from the following description of exemplary embodiments with reference to the attached drawings.

DESCRIPTION OF THE EMBODIMENTS

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

Hereinafter, descriptions shall be given regarding embodiments in which the information processing apparatus of the present invention is applied to a video camera, but it should be noted that the information processing apparatus is not limited to a video camera, and may be applied to, for example, a personal computer (PC) as well. Furthermore, although it is assumed that the video camera utilizes a Blu-ray disc (BD) as its recording medium, the recording medium is not limited thereto, and HD DVD discs may be used as well. In the following embodiments, it is assumed that image data recorded by the video camera is read out from the recording medium and reproduced by the image reproducing apparatus, but it should be noted that the image reproducing apparatus is selected based on the type of the recording medium. For example, a Blu-ray disc player, an HD DVD disc player, or the like can be selected.

First Embodiment

Figure 1:
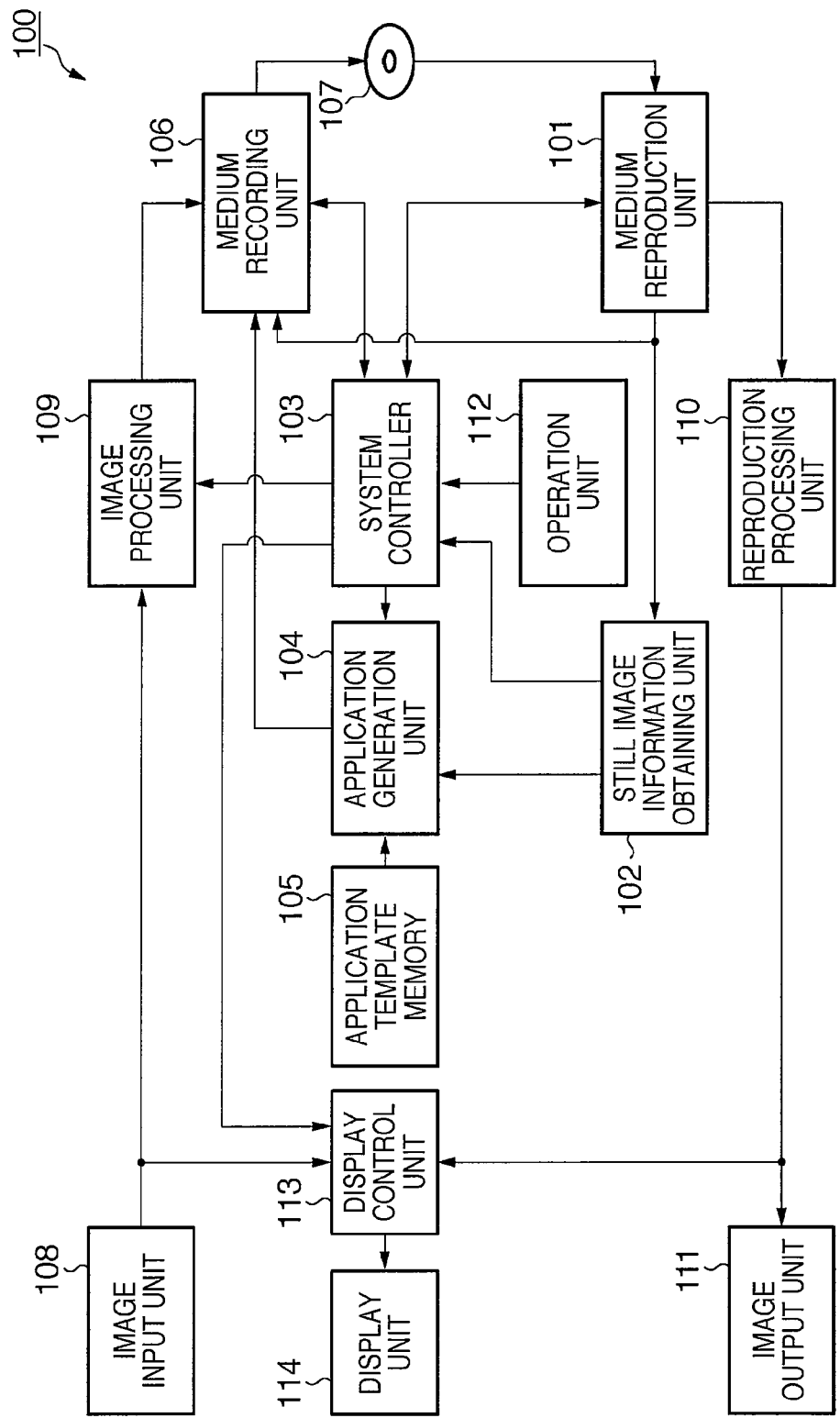
FIG. 1 is a function block diagram illustrating the configuration of a video camera according to a first embodiment of the present invention.

An embodiment in which the information processing apparatus of the present invention is applied to a video camera shall be described hereinafter with reference to FIG. 1. FIG. 1 is a function block diagram illustrating the configuration of a video camera 100 according to a first embodiment of the present invention.

Descriptions shall first be given regarding a basic operation for recording/reproducing moving image data and still image data, performed by the video camera 100.

In the video camera 100 shown in FIG. 1, an operation unit 112 includes various switches and operation buttons. Specifically, it includes a power switch, a mode switch for switching the operation mode of the video camera 100 between operation modes including a capturing mode and a reproducing mode, a capturing instruction button for the instruction of capturing moving image or still image, and the like. Moreover, the operation unit 112 includes an operation switch for instructing the generation of the application program for reproducing still image data recorded in a recording medium 107 (described later).

A system controller 103 controls the operation of respective units of the video camera 100 in accordance with the respective instructions output from the operation unit 112 based on the operation by the user.

Meanwhile, in the capturing mode, moving image data output by an image input unit 108 (described later) is output to a display control unit 113, and a display unit 114 displays the moving image obtained by the image input unit 108.

Moreover, in the reproducing mode, the reproduced moving or still image data is output to the display control unit 113, and the display unit 114 displays the reproduced moving or still image data. The moving or still image data reproduced in the reproducing mode may be output from the image output 111 to an external apparatus.

Meanwhile, the system controller 103 controls the display control unit 113 so that the display unit 114 displays various screens such as various menu screens and an operation screen for the instruction of generating the application program.

When an instruction to commence moving image recording has been input to the operation unit 112, moving image data input by the image input unit 108 is output to an image processing unit 109. A system controller 103 instructs the image processing unit 109 to execute the processing for moving image recording. The image processing unit 109 reduces the frame size of the input moving image data in accordance with the format in which the moving image data is recorded onto a recording medium 107. Furthermore, the image processing unit 109 encodes the reduced moving image data in accordance with a publicly-known scheme such as MPEG based on the stated recording format, and also performs other necessary processes. A medium recording unit 106 records the moving image data from the image processing unit 109 into the recording medium 107 in accordance with the moving image recording format, based on instructions from the system controller 103. When an instruction to stop recording moving image has been input to the operation unit, the system controller 103 instructs the medium recording unit 106 to stop recording, ending the recording of moving image data onto the recording medium 107.

Meanwhile, when an instruction to record still images has been input to the operation unit, the system controller 103 instructs the image processing unit 109 to extract a single screen from the moving image data input by the image input unit 108. The image processing unit 109 encodes the extracted single screen's worth of image data based on a format for recording still images onto the recording medium 107, performs other necessary processes, and outputs the resultant to the medium recording unit 106. The medium recording unit 106 records the still image data from the image processing unit 109 onto the recording medium 107 in accordance with the format for recording still images. In the present embodiment, the image processing unit 109 performs recording without reducing the size of the extracted still image data, but it should be noted that the still image data can be recorded at a desired size designated by a user or reduced to a predetermined size.

Furthermore, when an instruction for reproduction has been input via the operation unit, the system controller 103 instructs the medium reproduction unit 101 to reproduce the designated moving image data or still image data.

The medium reproduction unit 101 obtains the designated moving image data or still image data from the recording medium 107 and outputs that data to a reproduction processing unit 110. The reproduction processing unit 110 decodes the moving image data or still image data from the medium reproduction unit 101, and outputs the resultant to the exterior (for example, a liquid-crystal display of the video camera 100) via the image output unit 111.

The video camera 100 also includes a still image information obtaining unit 102, an application generation unit 104, and an application template memory 105. Details of these constituent elements shall be described later with reference to FIG. 4.

In this manner, the video camera 100 of FIG. 1 can record/reproduce still image data to/from the recording medium 107. However, a normal video player (image reproducing apparatus) that only has functionality for reproducing moving image data cannot reproduce the still image data.

Figure 2:
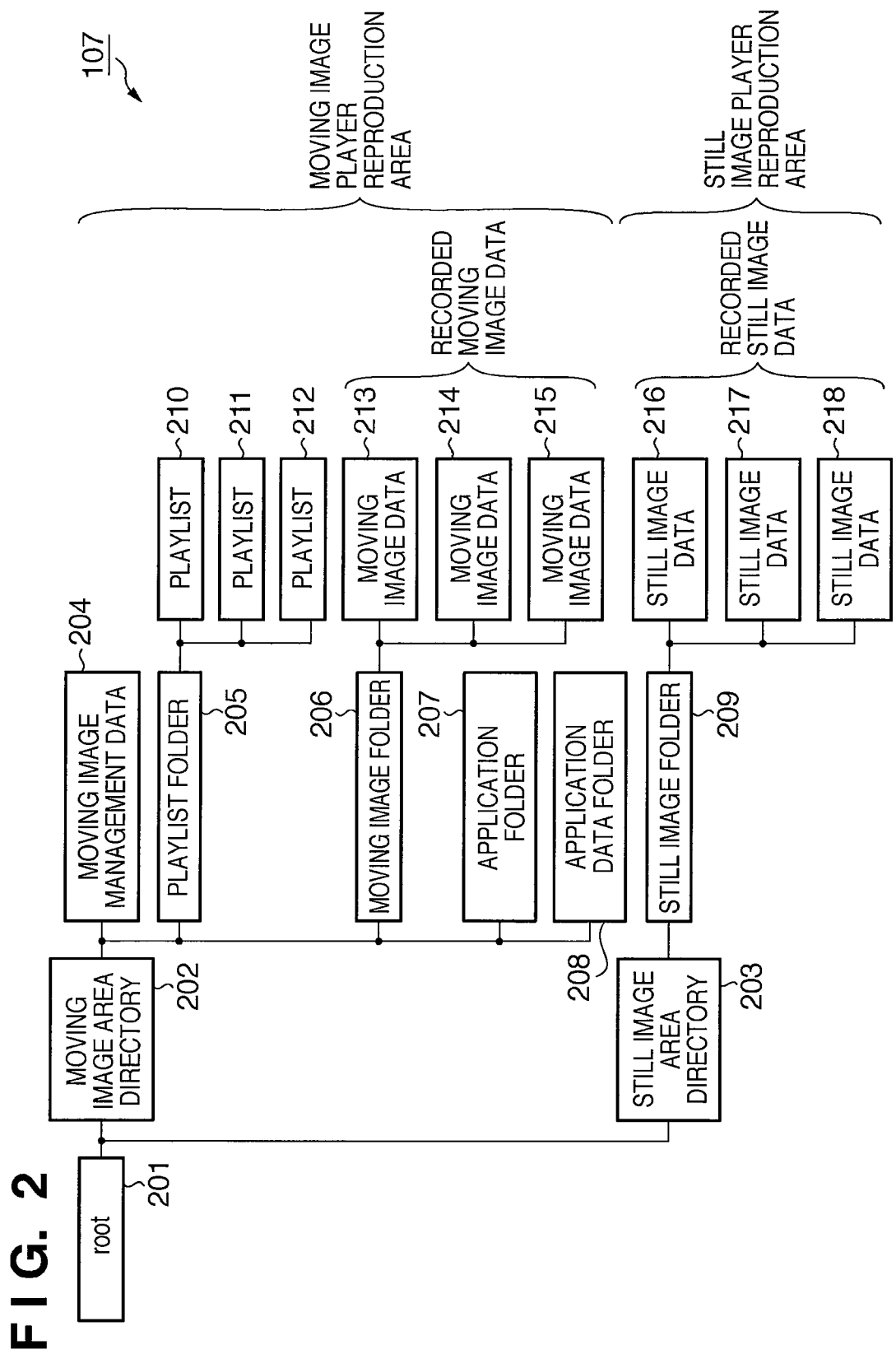
FIG. 2 is a diagram illustrating an example of a file directory structure of a recording medium onto which image data is recorded by a recording operation described with reference to FIG. 1.

FIG. 2 is a diagram illustrating an example of a file directory structure of the recording medium 107 onto which image data is recorded by the recording operation described with reference to FIG. 1. The recording medium 107 has a root directory 201. The root directory 201 has two directories: a moving image area directory 202 (a first area) in which is recorded data in accordance with a moving image data standard; and a still image area directory 203 (a second area) in which is recorded data in accordance with a still image data standard. A normal image reproducing apparatus, such as a BD player, can reproduce the data within the moving image area directory 202, but cannot reproduce the data within the still image area directory 203.

The moving image area directory 202 has moving image management data 204 in which is recorded information for managing the moving image data, and a playlist folder 205 in which is stored playlists 210 to 212 for controlling the reproduction of the moving image data. The moving image area directory 202 also has a moving image folder 206 in which is stored moving image data 213 to 215. The moving image area directory 202 further includes an application folder 207 in which are stored application programs that can be executed by the image reproducing apparatus, and an application data folder 208 in which is stored data used by the application programs.

"Application program" refers to, for example, a program that has been generated and recorded in accordance with the Blu-ray Disc Java standard (BD-J standard), which is standardized as part of the BD standard, and is written in the Java language. (Java is a registered trademark.) Therefore, a normal BD player can execute the application programs stored in the application folder 207. Using an application program makes it possible to implement movie playback, video game functions, and so on that are made interactive through user operations.

Meanwhile, the still image area directory 203 has a still image folder 209 in which is stored still image data 216 to 218 in accordance with a still image data standard. The present embodiment assumes that the Design Rule for Camera File (DCF) standard is used as the still image data standard. Using the DCF standard makes it possible to reproduce still image data even if that data has been recorded using video cameras or digital still cameras from different makers.

While the video camera 100 is capable of recording still image data onto disc-type media, such as BD discs, according to the DCF standard, the still image area directory 203 is not compliant with moving image data standards. Therefore, while the basic program of a normal image reproducing apparatus is capable of reproducing moving image data recorded in the moving image area directory 202, executing application programs, and so on, it is not capable of reproducing still image data recorded in the still image area directory 203.

Note that the still image area directory 203 is not limited to the DCF standard, and any standard may be used as long as it is a different standard than that of the moving image area directory 202. Furthermore, data aside from still image data, such as moving image data, may be stored in the still image area directory 203. While the following descriptions shall only discuss the still image data as image data to be reproduced by the stated image reproducing apparatus, moving image data may be included as well, or the data may be moving image data only.

As described below, the video camera 100 generates a reproducing program for reproducing the image data recorded in the still image area directory 203 as an application program that can be executed by the stated image reproducing apparatus.

The medium reproduction unit 101 reads out the still image data from the still image area directory 203 of the recording medium 107 under control performed by the system controller 103, and supplies the still image data to the still image information obtaining unit 102. The still image information obtaining unit 102 obtains, from the supplied still image data, information such as the path of the still image data in the recording medium 107, the total number of still images, and so on (still image recording information). The system controller 103 controls the application generation unit 104 based on the still image recording information, generating a Java application for reproducing the still image data recorded in the still image area directory 203.

The application generation unit 104 uses a template program pre-recorded in the application template memory 105 to generate the Java application (reproducing program). The template program is a reproducing program for executing a still image reproduction function, mentioned later, from which has been omitted information designating the image data to be reproduced, or in other words, the still image recording information. Therefore, the application generation unit 104 can generate the reproducing program by adding the path of the still image data in the recording medium 107, the total number of still images, and so on to the template program.

A still image slideshow display function, a still image album display function, a photomovie display function that adds video-like effects to still images, and so on can be given as examples of functions provided in the reproducing program. While high processing capabilities are necessary to automatically generate a generic application program, the processing can be simplified by using such a template program prepared in advance. Therefore, even information processing apparatuses such as household video cameras can easily generate the reproducing program.

The generated reproducing program (still image browsing application) is recorded in the moving image area directory 202 of the recording medium 107 by the medium recording unit 106 in accordance with the BD-J standard.

Figure 4:
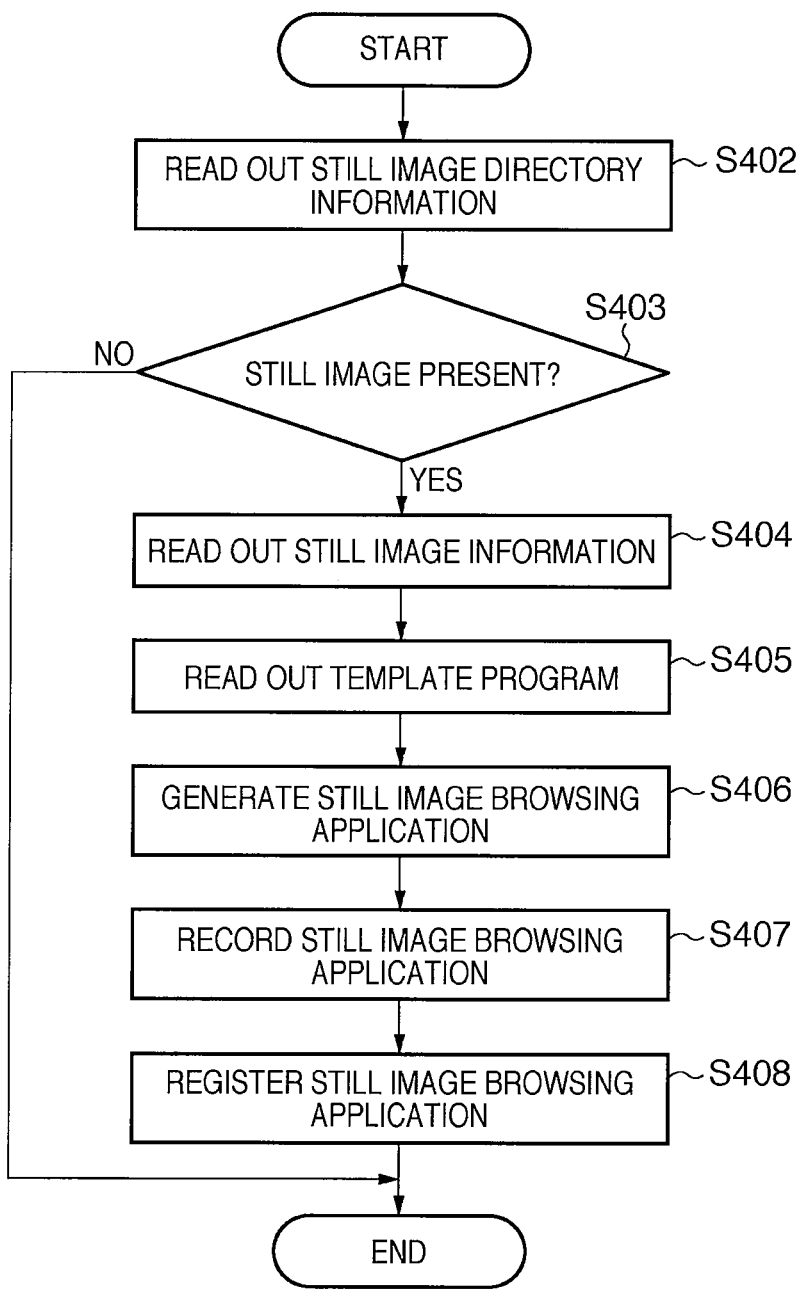
FIG. 4 is a flowchart illustrating the flow of a process by which a video camera generates a reproducing program according to the first embodiment.

FIG. 4 is a flowchart illustrating the flow of the process by which the video camera 100 generates the reproducing program. Upon receiving, via the operation unit (not shown), an instruction to generate the reproducing program, the video camera 100 commences the processing illustrated in this flowchart. Unless indicated otherwise, each step in FIG. 4 is implemented by the various constituent elements of the video camera 100 operating under the control of the system controller 103 (this applies to the other flowcharts referred to later as well).

In S402, the video camera 100 reads out the directory information of the still image area directory 203. In S403, the video camera 100 determines whether or not still image data is present. The process moves to S404 in the case where still image data is present, and ends in the case where no still image data is present.

In S404, the video camera 100 reads out the still-image-related information. In S405, the video camera 100 reads out the template program stored in the application template memory 105.

In S406, the video camera 100 generates the reproducing program by combining the still-image-related information with the template program.

In S407, the video camera 100 records the generated reproducing program into the application folder 207 of the moving image area directory 202. In S408, the video camera 100 updates the moving image management data 204 in order to register the reproducing program in the moving image management data 204 as a Java application title. As a result, the image reproducing apparatus can execute the reproducing program.

Figure 3:
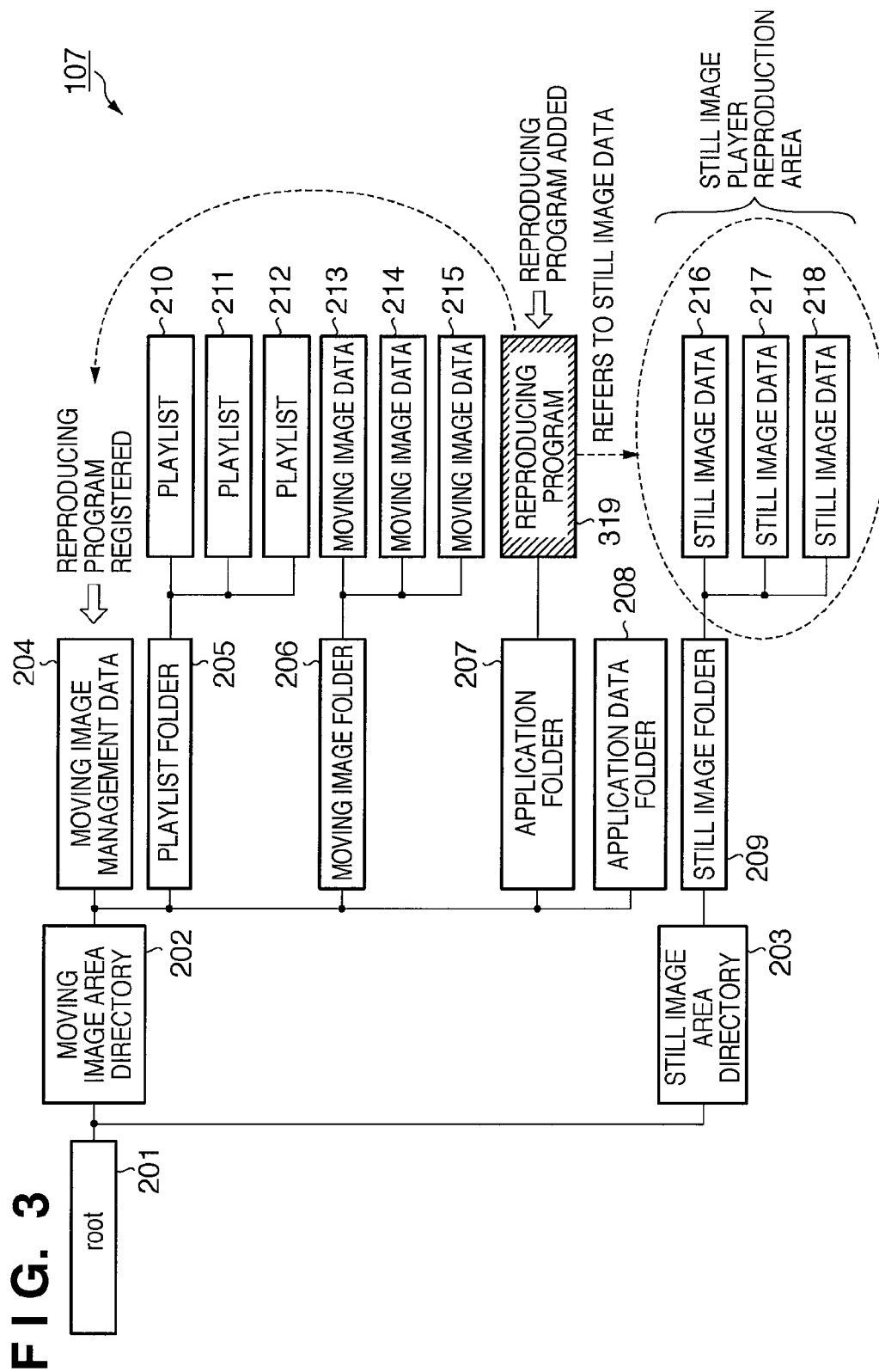
FIG. 3 is a diagram illustrating a file directory structure of a recording medium following the execution of a process for generating a reproducing program.

FIG. 3 is a diagram illustrating the file directory structure of the recording medium 107 following the execution of the process for generating the reproducing program. In FIG. 3, elements identical to those in FIG. 2 are given identical reference numerals, and descriptions thereof shall be omitted.

A reproducing program 319 that has been added to the application folder 207 is a still image browsing application generated in S406 of FIG. 4. The reproducing program 319 is registered in the moving image management data 204 as a Java application title, and thus image reproducing apparatuses compliant with the standard of the moving image area directory 202 can execute the program normally. Furthermore, the reproducing program 319 includes instructions for causing the image reproducing apparatus to obtain the still image data recorded in the still image area directory 203. Therefore, the image reproducing apparatus can read out and reproduce the still image data 216 to 218 recorded in the still image area directory 203 by executing the reproducing program 319.

<Variation 1>

Some moving image data standards limit the files an application title can refer to the files stored in the moving image area directory 202. With such a standard, the reproducing program 319 cannot directly read out the still image data from the still image area directory 203. Accordingly, in Variation 1, the video camera 100 copies the still image data to be reproduced by the reproducing program 319 into the moving image area directory 202 from the still image area directory 203.

In other words, the system controller 103 controls the application generation unit 104 based on the still image recording information, generating a Java application for reproducing the still image data recorded in the still image area directory 203. Furthermore, the medium reproduction unit 101 reads out the still image data to be reproduced stored in the still image folder 209 from the recording medium 107 and supplies that data to the medium recording unit 106, under the control of the system controller 103. The medium recording unit 106 stores the supplied image data in the application data folder 208 by recording it therein.

Figure 5:
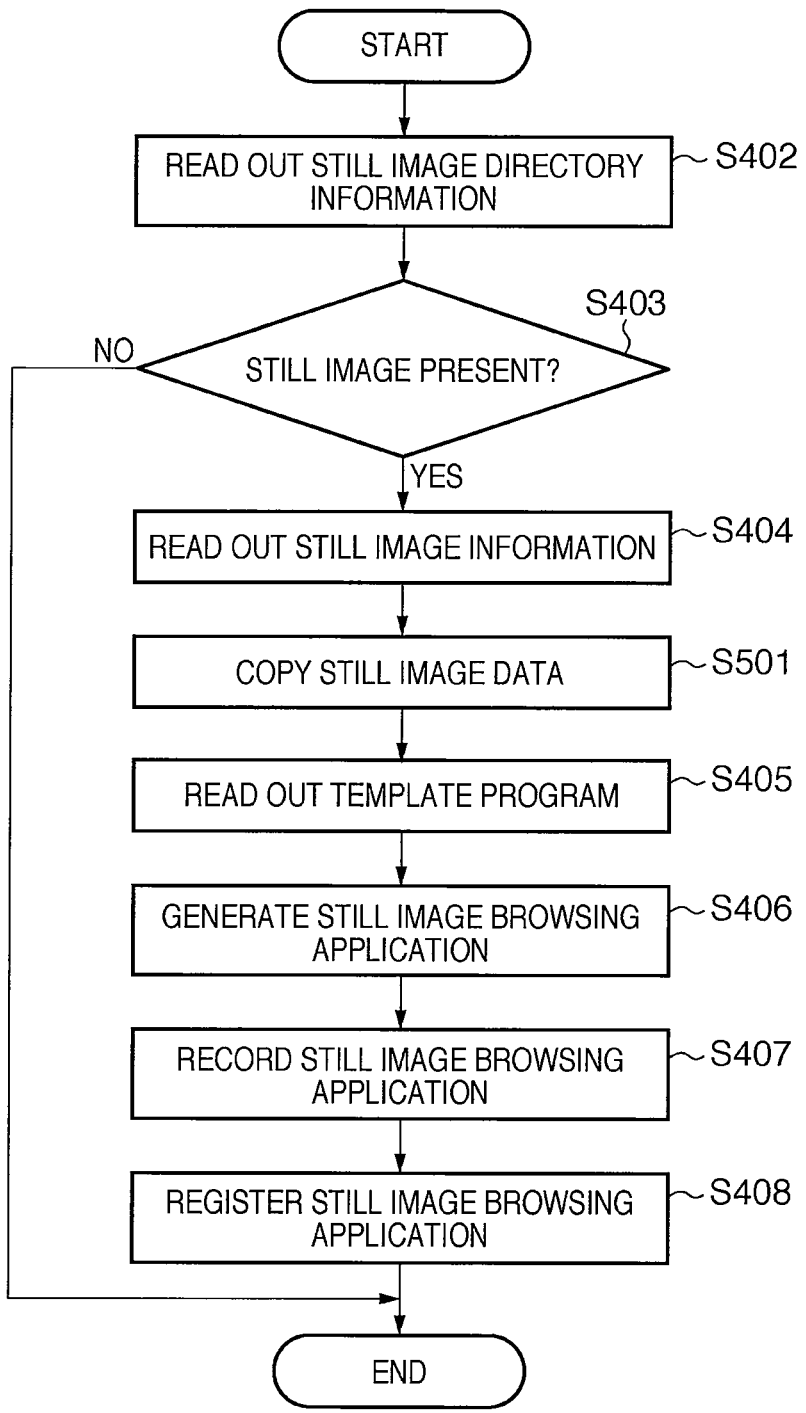
FIG. 5 is a flowchart illustrating the flow of a process for generating a reproducing program according to Variation 1 of the first embodiment.

FIG. 5 is a flowchart illustrating the flow of a process for generating the reproducing program according to Variation 1. In FIG. 5, steps that perform processes identical to those in FIG. 4 are given identical reference numerals, and descriptions thereof shall be omitted. In S501, the video camera 100 performs the abovementioned copy process.

Figure 6:
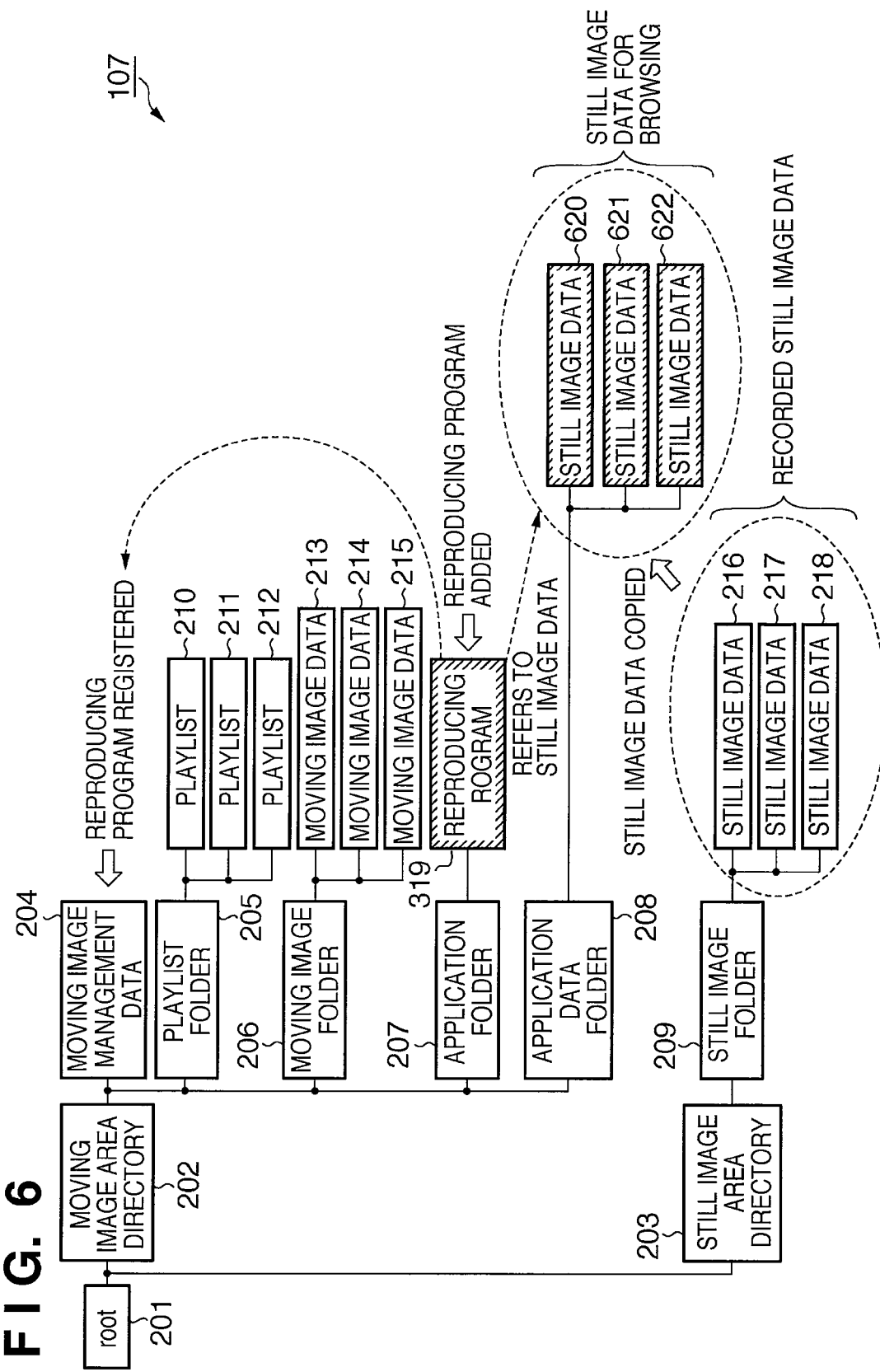
FIG. 6 is a diagram illustrating a file directory structure of a recording medium following the execution of a process for generating a reproducing program according to Variation 1 of the first embodiment.

FIG. 6 is a diagram illustrating the file directory structure of the recording medium 107 following the execution of the process for generating the reproducing program according to Variation 1. In FIG. 6, elements identical to those in FIG. 3 are given identical reference numerals, and descriptions thereof shall be omitted.

In Variation 1, the still image data 216 to 218 is copied into the application data folder 208 as still image data 620 to 622. The reproducing program includes instructions for causing the image reproducing apparatus to obtain the still image data within the application data folder 208. Therefore, the image reproducing apparatus can read out and reproduce the still image data 620 to 622 recorded in the still image area directory 202 by executing the reproducing program 319.

<Variation 2>

In Variation 1, the image data to be reproduced itself is copied into the moving image area directory 202. However, there are also situations where the moving image data standard allows an application program to read files that are linked in the file system. In such a case, the video camera 100 may generate link data for the still image data and record the data in the moving image area directory 202, rather than copying the still image data.

Figure 7:
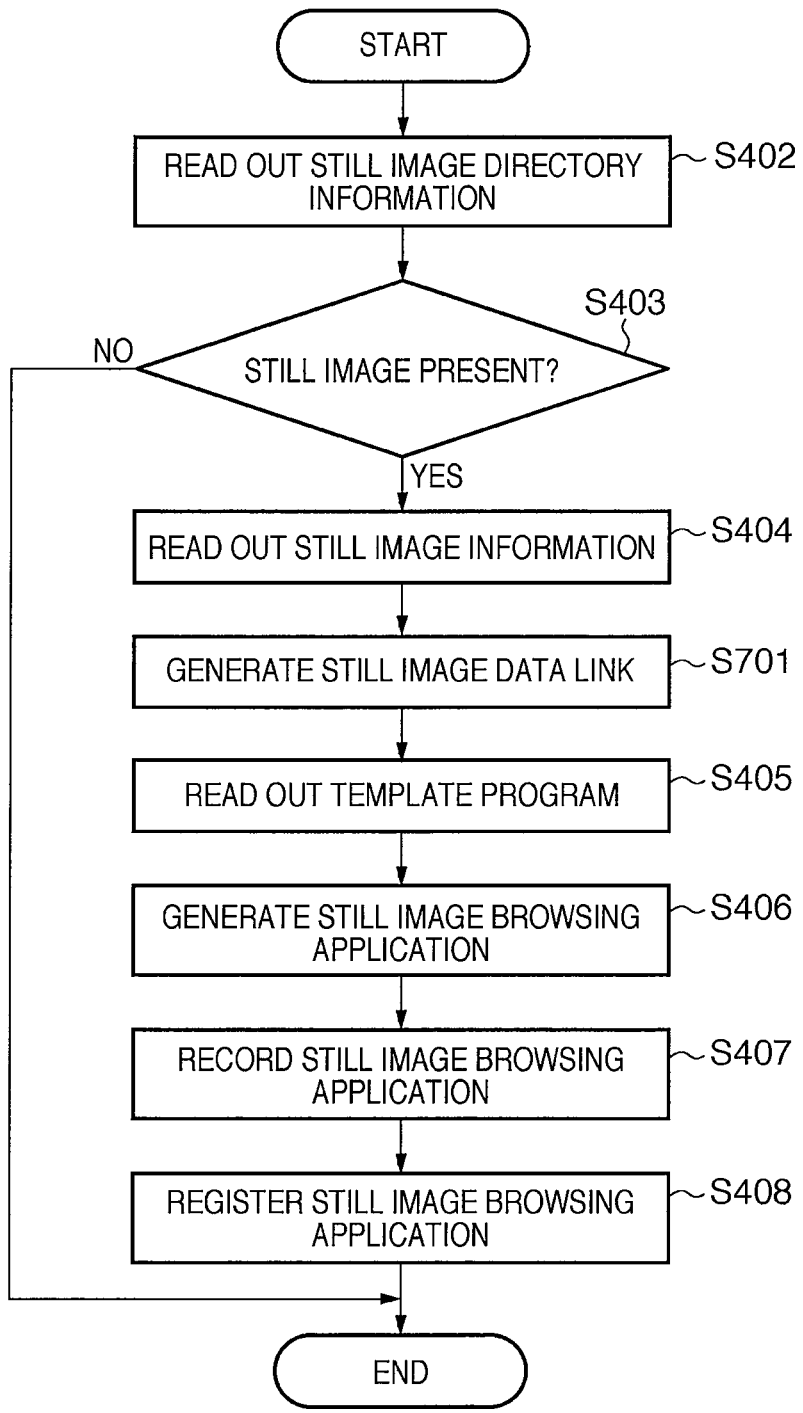
FIG. 7 is a flowchart illustrating the flow of a process for generating a reproducing program according to Variation 2 of the first embodiment.

FIG. 7 is a flowchart illustrating the flow of a process for generating the reproducing program according to Variation 2. In FIG. 7, steps that perform processes identical to those in FIG. 4 are given identical reference numerals, and descriptions thereof shall be omitted. In S701, the video camera 100 generates link data for the still image data in the still image area directory 203 (link generation), and records the data in the application data folder 208.

Figure 8:
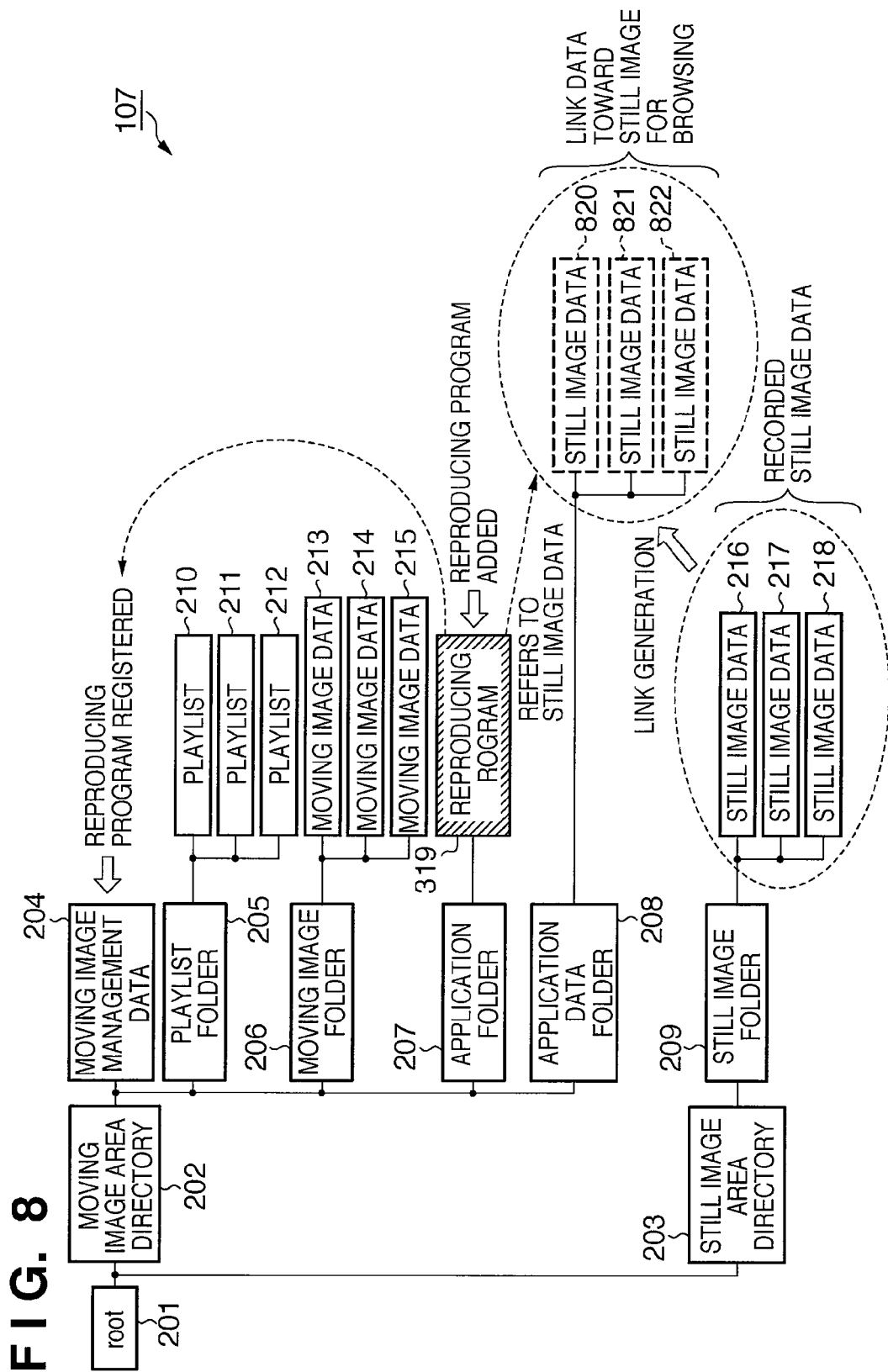
FIG. 8 is a diagram illustrating a file directory structure of a recording medium following the execution of a process for generating a reproducing program according to Variation 2 of the first embodiment.

FIG. 8 is a diagram illustrating the file directory structure of the recording medium 107 following the execution of the process for generating the reproducing program according to Variation 2. In FIG. 8, elements identical to those in FIG. 3 are given identical reference numerals, and descriptions thereof shall be omitted.

In Variation 2, link data 820 to 822 for the still image data 216 to 218 is recorded into the application data folder 208. The reproducing program includes instructions for causing the image reproducing apparatus to obtain the link data within the application data folder 208. Therefore, the image reproducing apparatus can read out and reproduce the still image data 216 to 218 via the link data 820 to 822 recorded in the moving image area directory 202 by executing the reproducing program 319.

<Variation 3>

With Java application programs, the application itself and the data it uses can be consolidated into a single file in the JAR file format. Therefore, while the video camera 100 copies the still image data into the application data folder 208 in Variation 2, this data is included within the reproducing program 319 in Variation 3.

Figure 9:
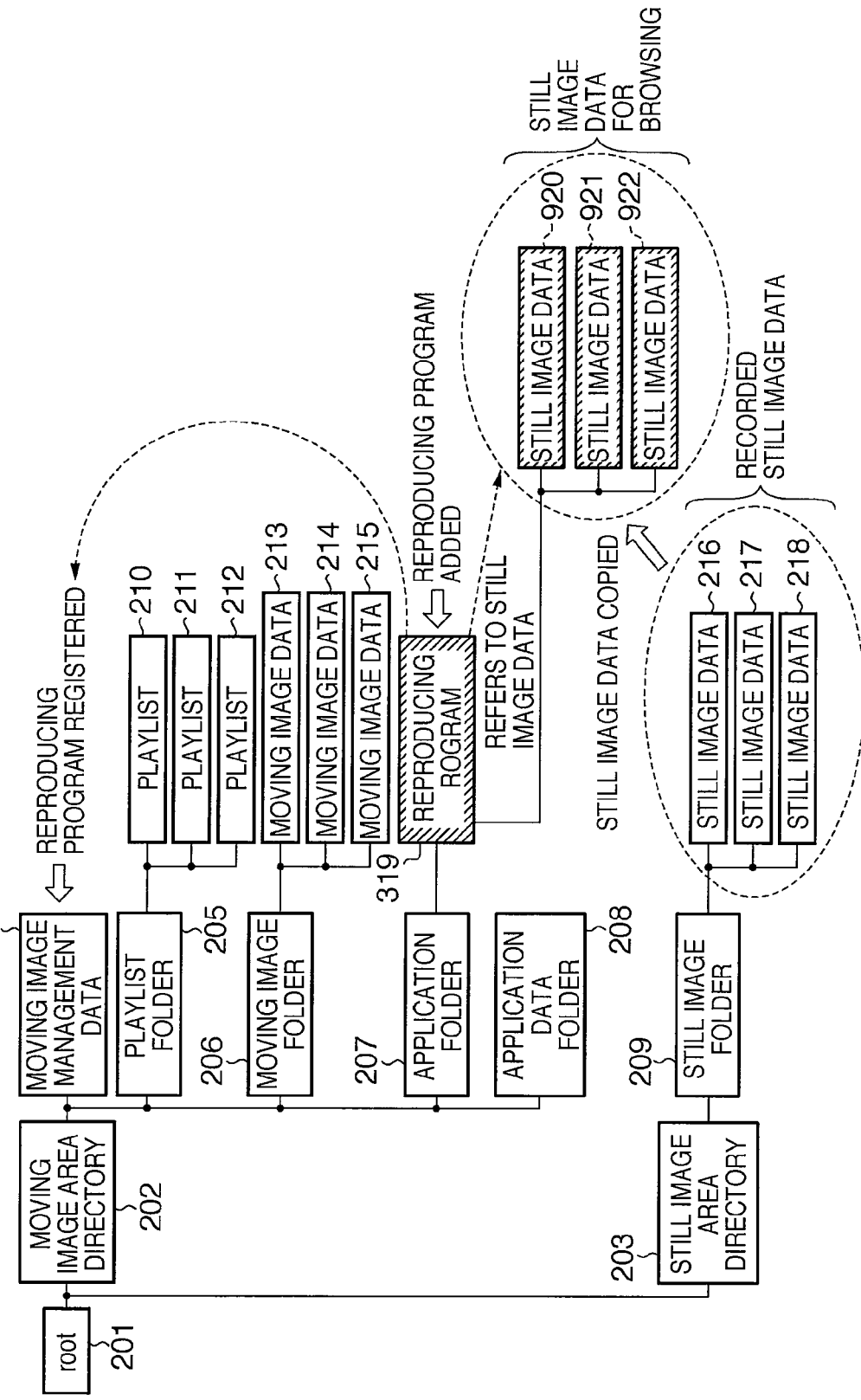
FIG. 9 is a diagram illustrating a file directory structure of a recording medium following the execution of a process for generating a reproducing program according to Variation 3 of the first embodiment.

FIG. 9 is a diagram illustrating the file directory structure of the recording medium 107 following the execution of the process for generating the reproducing program according to Variation 3. In FIG. 9, elements identical to those in FIG. 3 are given identical reference numerals, and descriptions thereof shall be omitted.

As shown in FIG. 9, the reproducing program 319 includes still image data 920 to 922, which is a copy of the still image data 216 to 218. Therefore, the image reproducing apparatus can reproduce still image data identical to the still image data 216 to 218 recorded in the still image area directory 203 by executing the reproducing program 319.

Note that the video camera 100 may include link data for the still image data 216 to 218 in the reproducing program 319, rather than the still image data 920 to 922.

<Variation 4>

Figure 10:
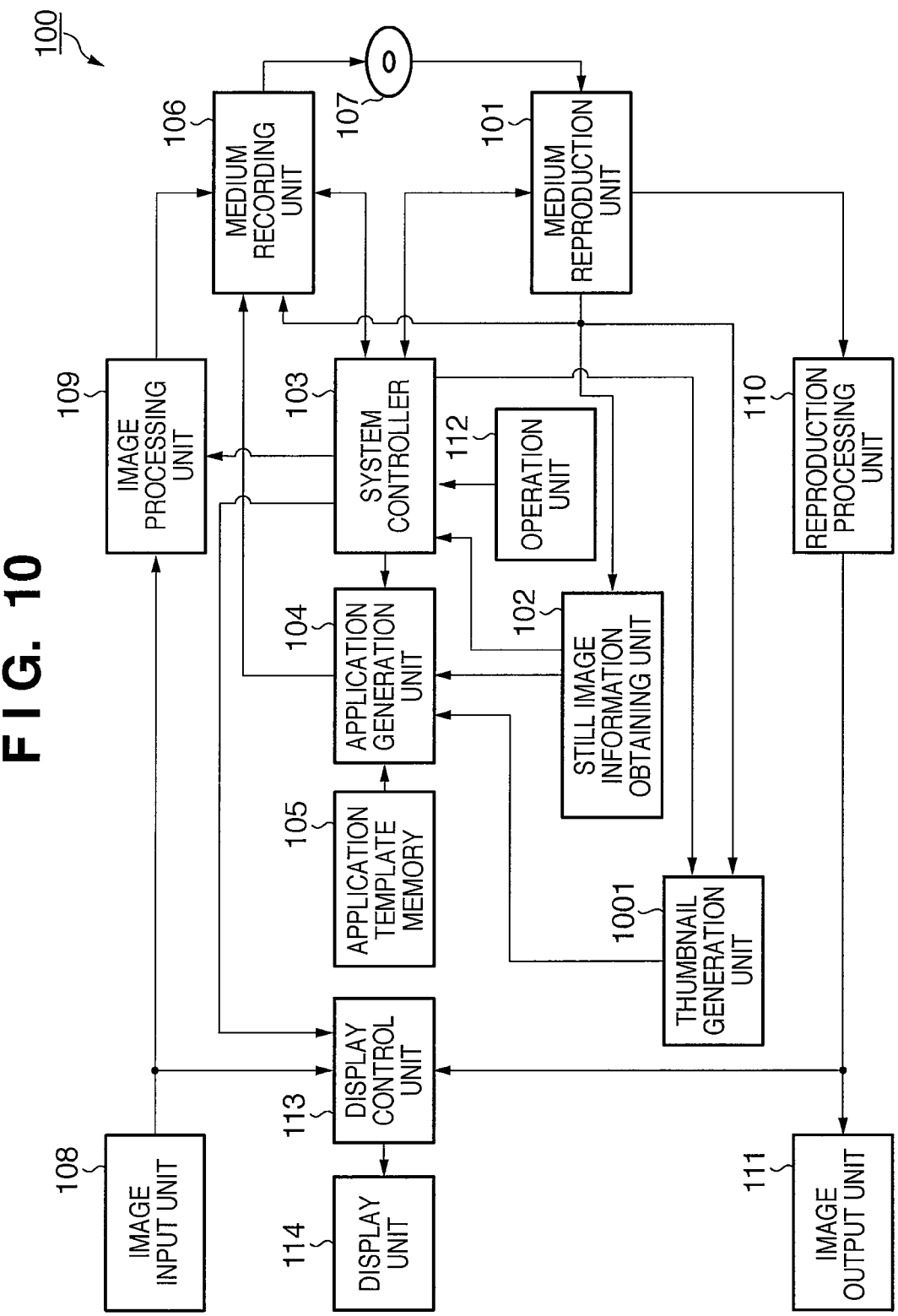
FIG. 10 is a function block diagram illustrating the configuration of a video camera according to Variation 4 of the first embodiment.

In Variation 4, the video camera 100 includes a thumbnail generation unit 1001, as shown in FIG. 10. In FIG. 10, constituent elements identical to those in FIG. 1 are given identical reference numerals, and descriptions thereof shall be omitted. The thumbnail generation unit 1001 obtains the still image data recorded in the still image area directory 203 via the medium reproduction unit 101, and, under the control of the system controller 103, generates thumbnail data (still image list data) for displaying the content of the still image data as an index screen. The generated thumbnail data is then recorded in the recording medium 107 via the medium recording unit 106. Furthermore, the application generation unit 104 includes information that links the still images in the thumbnail data to the corresponding still image data recorded in the still image area directory 203 in the reproducing program 319.

Figure 11:
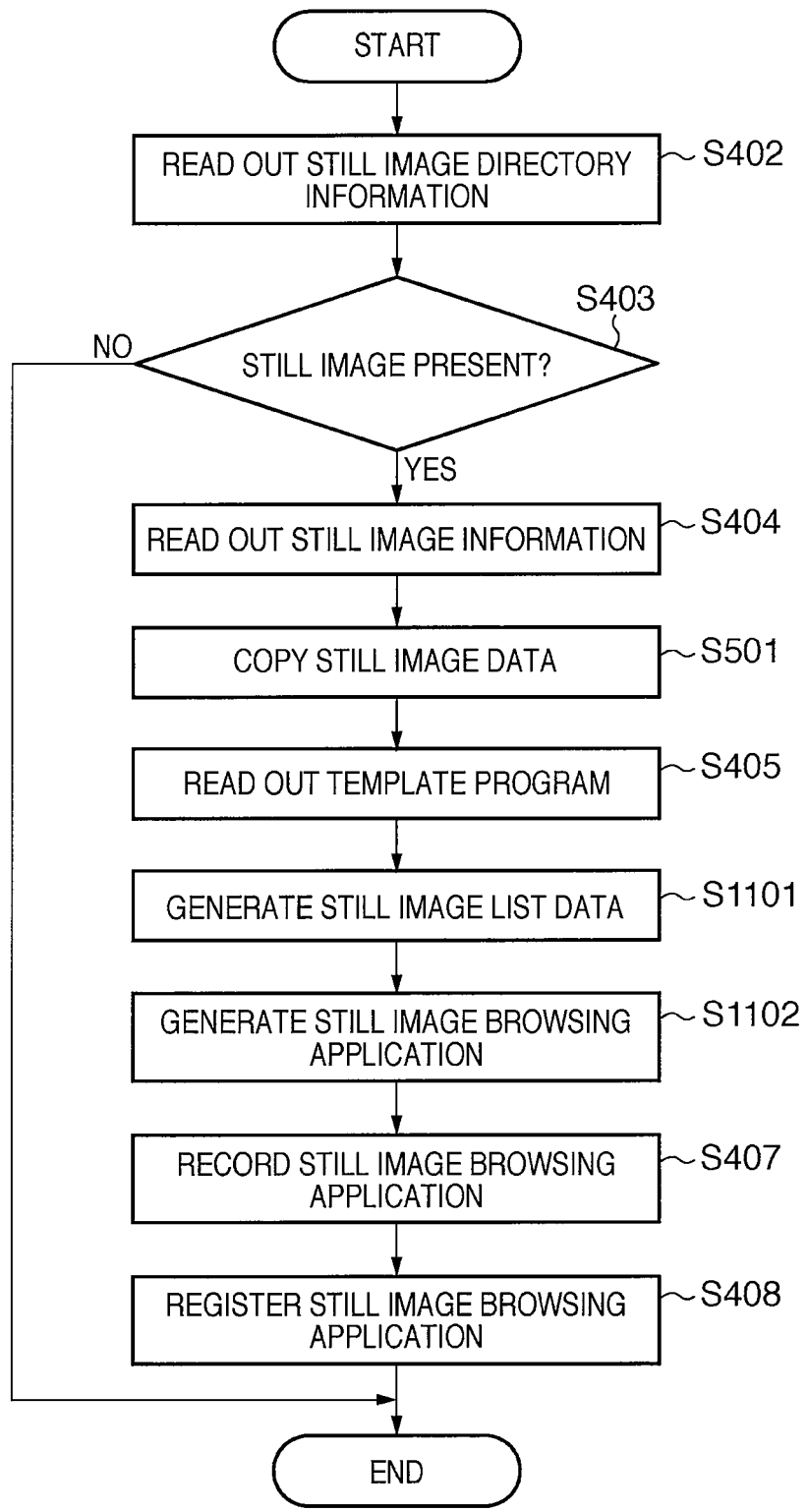
FIG. 11 is a flowchart illustrating the flow of a process for generating a reproducing program according to Variation 4 of the first embodiment.

FIG. 11 is a flowchart illustrating the flow of a process for generating the reproducing program according to Variation 4. In FIG. 11, steps that perform processes identical to those in FIG. 5 are given identical reference numerals, and descriptions thereof shall be omitted.

In S1101, the video camera 100 generates thumbnail data based on the still image data supplied by the medium reproduction unit 101. In S1102, the application generation unit 104 includes the thumbnail data in the reproduction application. The other processes carried out in S1102 are identical to those of S406.

Figure 12:
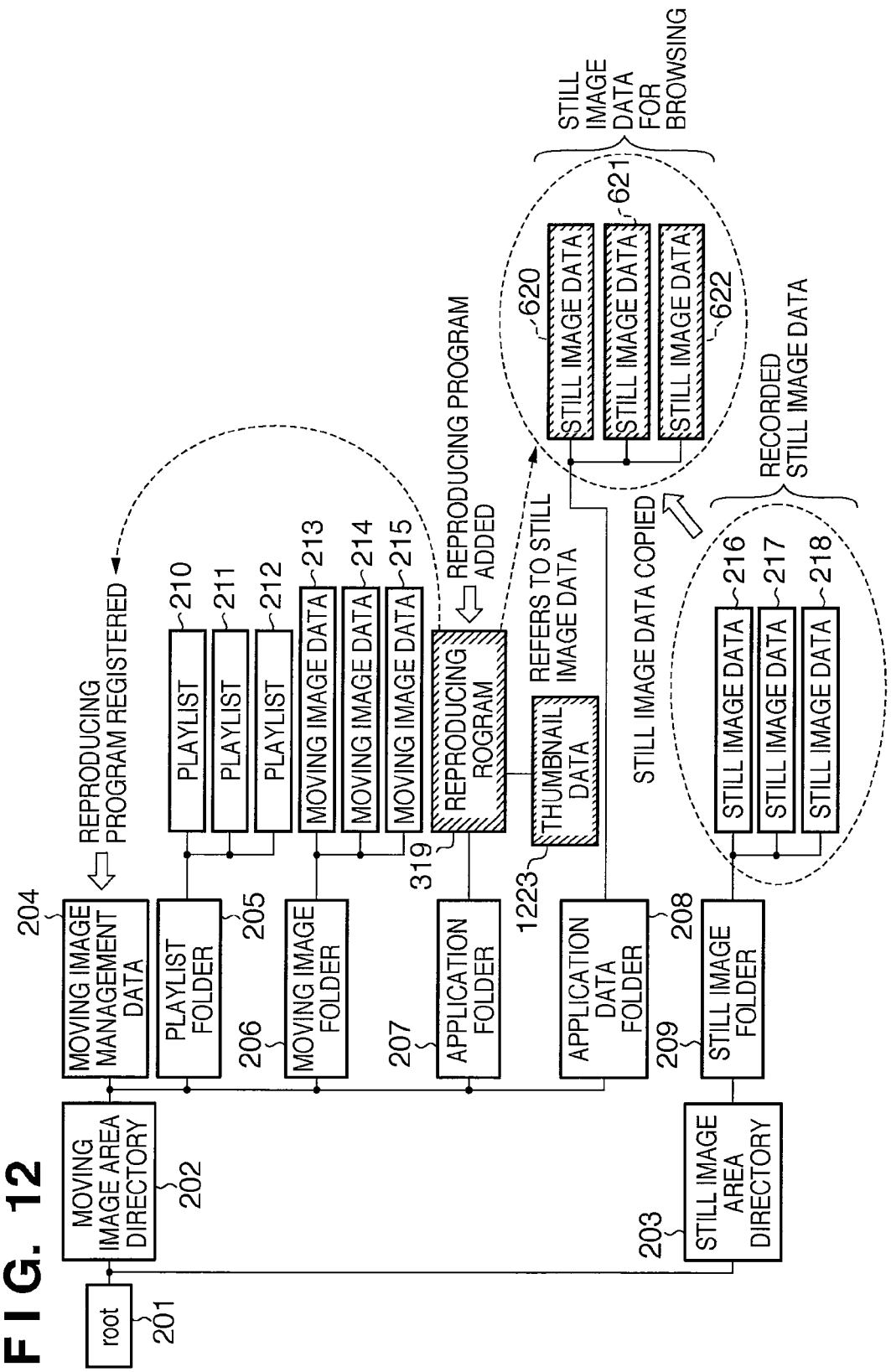
FIG. 12 is a diagram illustrating a file directory structure of a recording medium following the execution of a process for generating a reproducing program according to Variation 4 of the first embodiment.

FIG. 12 is a diagram illustrating the file directory structure of the recording medium 107 following the execution of the process for generating the reproducing program according to Variation 4. In FIG. 12, elements identical to those in FIG. 6 are given identical reference numerals, and descriptions thereof shall be omitted.

As shown in FIG. 12, the reproducing program 319 is recorded in the JAR file format, including thumbnail data 1223. However, for example, the thumbnail data 1223 may be recorded into the application data folder 208.

When the image reproducing apparatus executes the reproducing program 319, thumbnails of the still image data 620 to 622 are displayed based on the thumbnail data 1223. The user can use the thumbnail display screen to select the desired still image data.

As described thus far, according to the present embodiment, the video camera 100 generates a reproducing program 319 for reproducing image data that normally cannot be reproduced by the image reproducing apparatus (image data recorded in the still image area directory 203 of the recording medium 107). The reproducing program 319 is recorded into the moving image area directory 202 of the recording medium 107 in accordance with a standard executable by the image reproducing apparatus.

Through this, it is possible to enable the reproduction of image data recorded in accordance with a standard that cannot be reproduced by the image reproducing apparatus while suppressing a drop in image quality.

Second Embodiment

Figure 13:
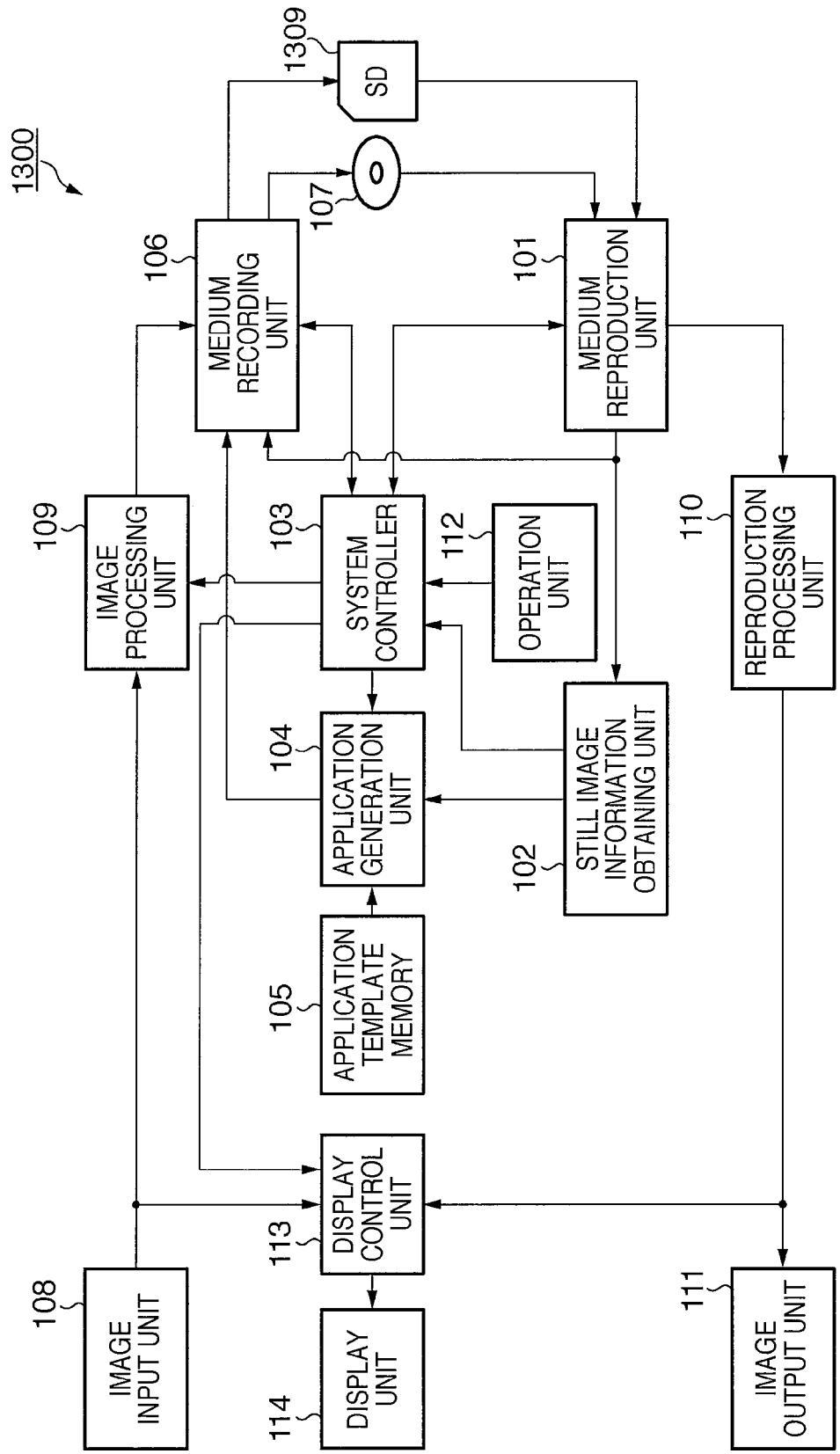
FIG. 13 is a function block diagram illustrating the configuration of a video camera according to a second embodiment of the present invention.

In the first embodiment, the video camera 100 records both the data recorded in a still image data standard and the data recorded in a moving image data standard into a recording medium for an image reproducing apparatus. However, video cameras capable of recording moving image data, still image data, and so on onto multiple types of recording media are becoming widespread. Accordingly, the second embodiment describes a configuration in which a video camera 1300 records still image data into a memory card 1309, such as an SD card, which serves as the recording medium, as shown in FIG. 13. In FIG. 13, constituent elements identical to those in FIG. 1 are given identical reference numerals, and descriptions thereof shall be omitted.

The video camera 1300 records data according to a moving image data standard onto a recording medium 107 (a first recording medium), and records data according to a still image data standard into the memory card 1309 (a second recording medium).

Furthermore, the video camera 1300 copies the image data to be reproduced from the memory card 1309 to the recording medium 107 when the reproducing program is generated. The copy destination in the recording medium 107 may be the moving image area directory, which is the same area in which the reproducing program is recorded, or may be a different area altogether. However, because still image data to be reproduced does not originally exist in the recording medium 107, it is necessary to record the still image data to be reproduced into the recording medium 107, unlike in the first embodiment.

The process for generating the reproducing program is the same as that in the first embodiment, with the exception of two points: one, that the copy source is the memory card 1309 instead of the recording medium 107; and two, that the copy destination area may be the moving image area directory or the still image area directory. Descriptions shall therefore be omitted (see FIG. 5).

Figure 14:
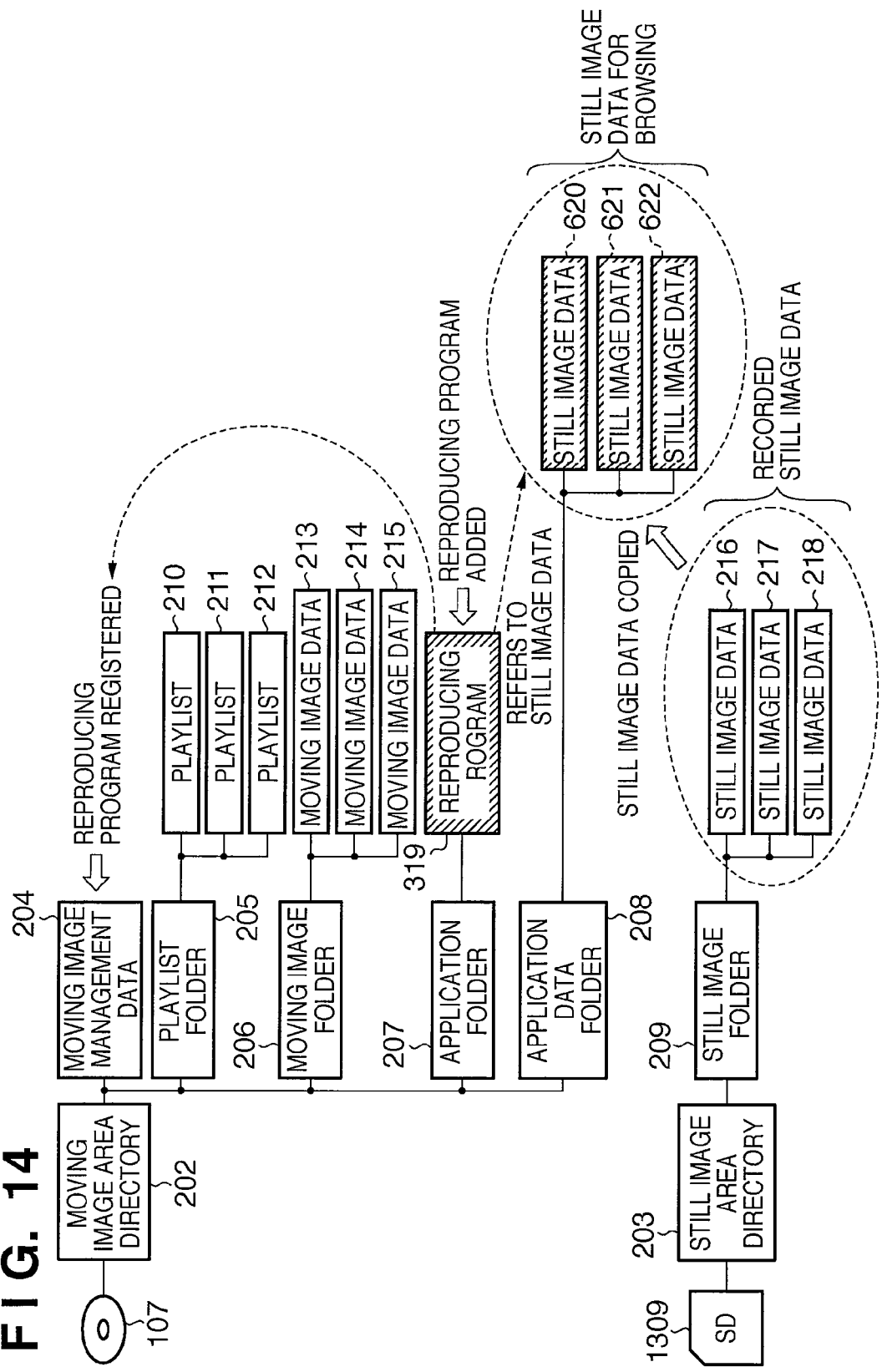
FIG. 14 is a diagram illustrating a file directory structure of a recording medium and an SD (Secure Digital) memory card following the execution of a process for generating a reproducing program according to the second embodiment.

FIG. 14 is a diagram illustrating a file directory structure of the recording medium 107 and the memory card 1309 following the execution of the process for generating the reproducing program according to the second embodiment. In FIG. 14, elements identical to those in FIG. 6 are given identical reference numerals, and descriptions thereof shall be omitted. Furthermore, although not shown in FIG. 14, the recording medium 107 may have a still image area directory, as in the first embodiment.

Still image data 620 to 622, copied from the memory card 1309, is recorded into the application data folder 208 of the moving image area directory 202. Therefore, the image reproducing apparatus can read out and reproduce the still image data 620 to 622 by executing the reproducing program 319.

<Variation 5>

In the above embodiment, the moving image data and still image data are recorded/reproduced in a state where the recording medium 107 and the memory card 1309 are both attached to the same camera, that is, the video camera 1300. However, the image data to be reproduced may be supplied from a source that is external to the information processing apparatus of the present invention. Variation 5 describes such a case.

Figure 15:
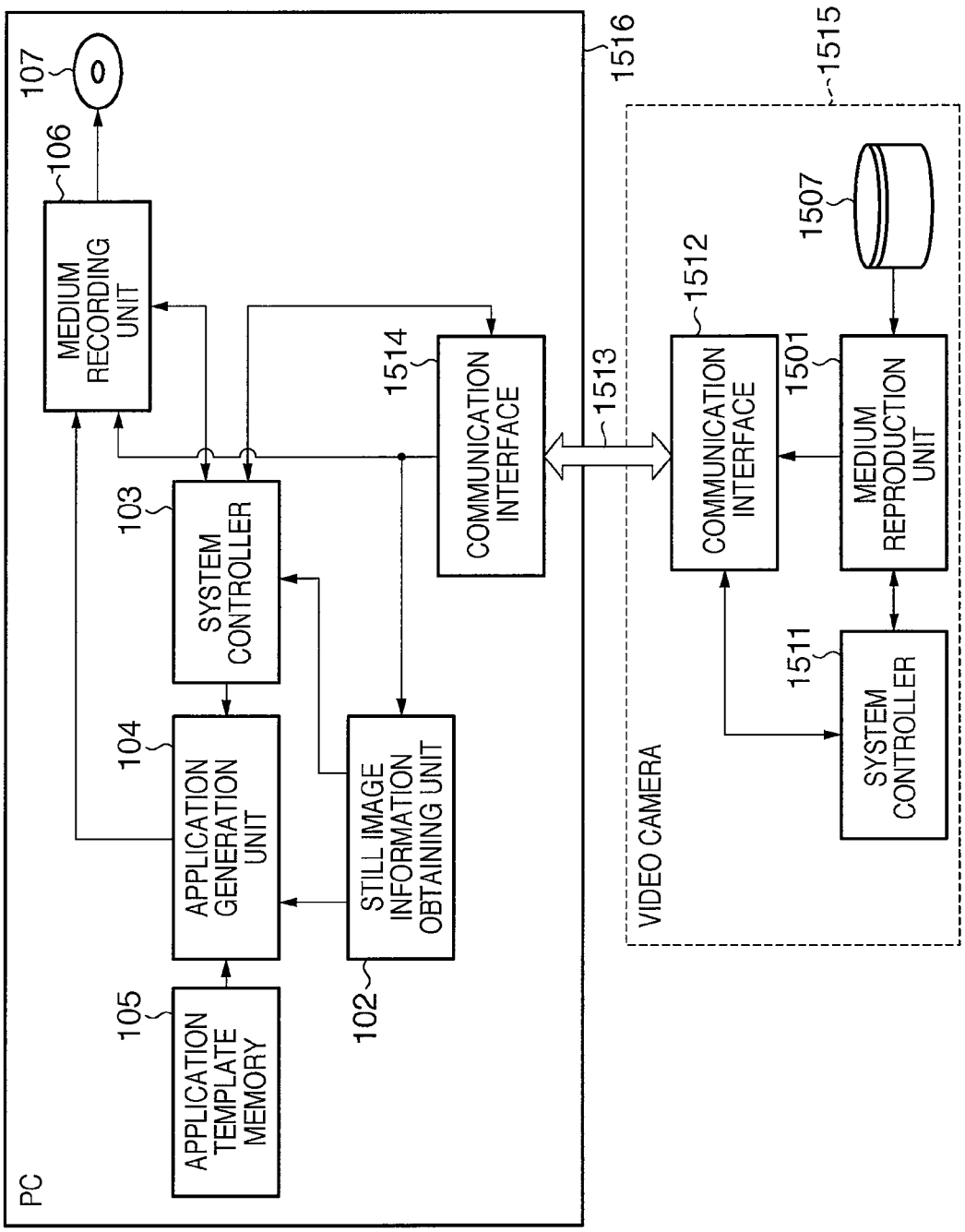
FIG. 15 is a function block diagram illustrating the configurations of a personal computer (PC) and a video camera according to Variation 5 of the second embodiment.

FIG. 15 is a function block diagram illustrating the configuration of a PC 1516 and a video camera 1515 according to Variation 5 of the second embodiment. In FIG. 15, constituent elements identical to those in FIG. 1 are given identical reference numerals, and descriptions thereof shall be omitted. In Variation 5, the information processing apparatus of the present invention is applied to the PC 1516.

In Variation 5, it is assumed that the moving image data according to a moving image data standard has already been transferred from a recording medium 1507, which is the transfer source, to the recording medium 107, which is the transfer destination, prior to the process for generating the reproducing program.

Moving image data recorded in accordance with a moving image data standard is recorded in the recording medium 1507, which is the transfer source, along with still image data recorded in accordance with a still image data standard, different from the moving image data standard.

The file directory structure of the recording medium 1507 is the same as that described with reference to FIG. 2, and thus descriptions thereof shall be omitted. Furthermore, it is assumed that data transfer has already been carried out to the recording medium 107, which is the transfer destination, using the same file directory structure as the recording medium 1507.

A medium reproduction unit 1501 reads out the still image data from the recording medium 1507 in accordance with control performed by a system controller 1511 and the system controller 103. The still image data is then supplied to the still image information obtaining unit 102 via a transmission path 1513 connected between a communication interface 1512 and a communication interface 1514.

The still image information obtaining unit 102 obtains still image information from the supplied still image data. Based on the still image recording information, the system controller 103 transfers the still image data in the still image area directory (not shown) of the recording medium 1507 to the application data folder 208 of the moving image area directory 202 of the recording medium 107 via the transmission path 1513. Meanwhile, the system controller 103 controls the application generation unit 104, generating a reproducing program 319 for reproducing the still image data transferred to the application data folder 208 of the recording medium 107. At this time, the application generation unit 104 uses template data recorded in the application template memory 105 to generate the reproducing program 319. The medium recording unit 106 records the generated reproducing program 319 into the moving image area directory 202 of the recording medium 107 in accordance with the moving image data standard.

Figure 16:
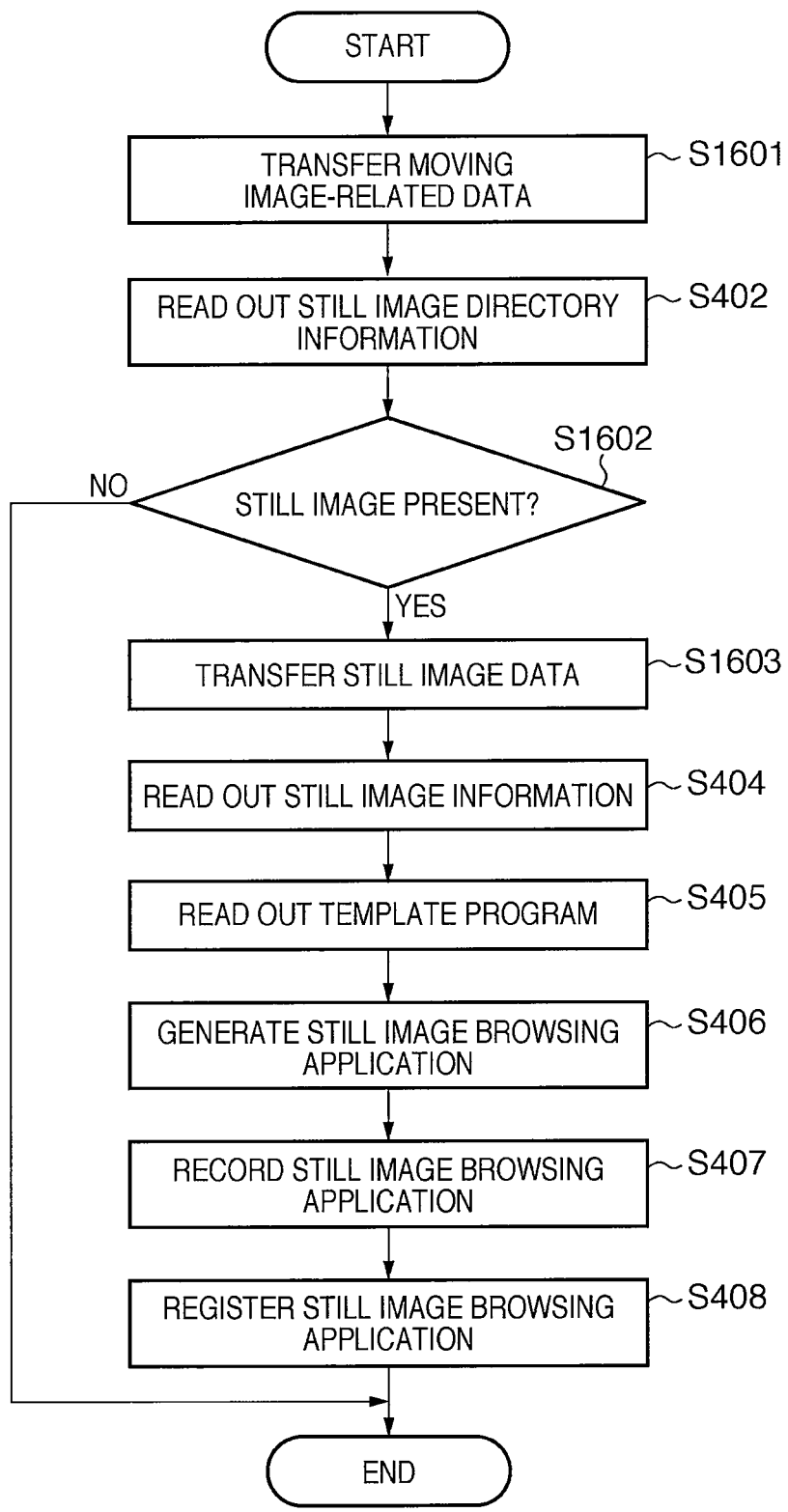
FIG. 16 is a flowchart illustrating the flow of a process for generating a reproducing program according to Variation 5 of the second embodiment.
Figure 17:
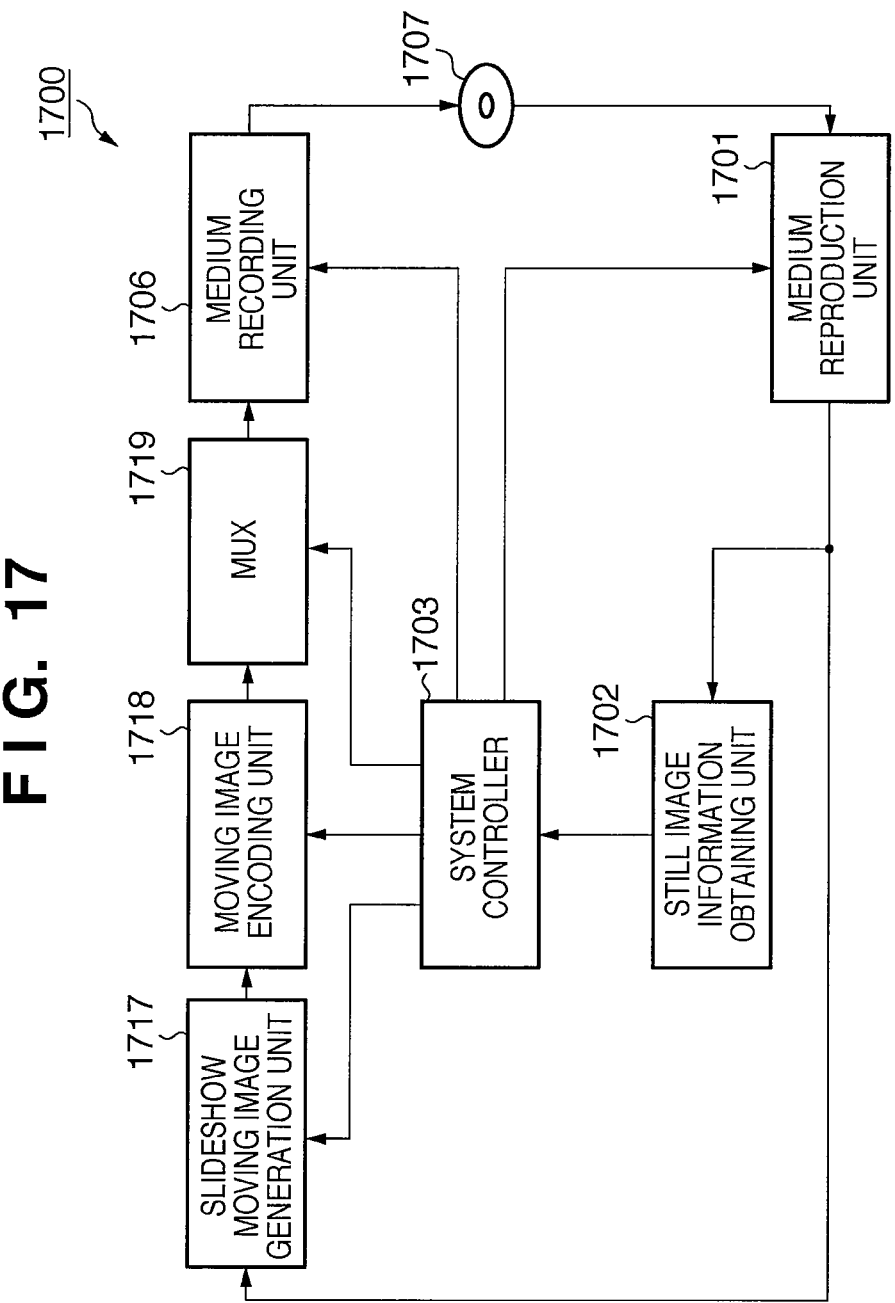
FIG. 17 is a function block diagram illustrating the configuration of an information processing apparatus that generates and records moving image data based on still image data.
Figure 18:
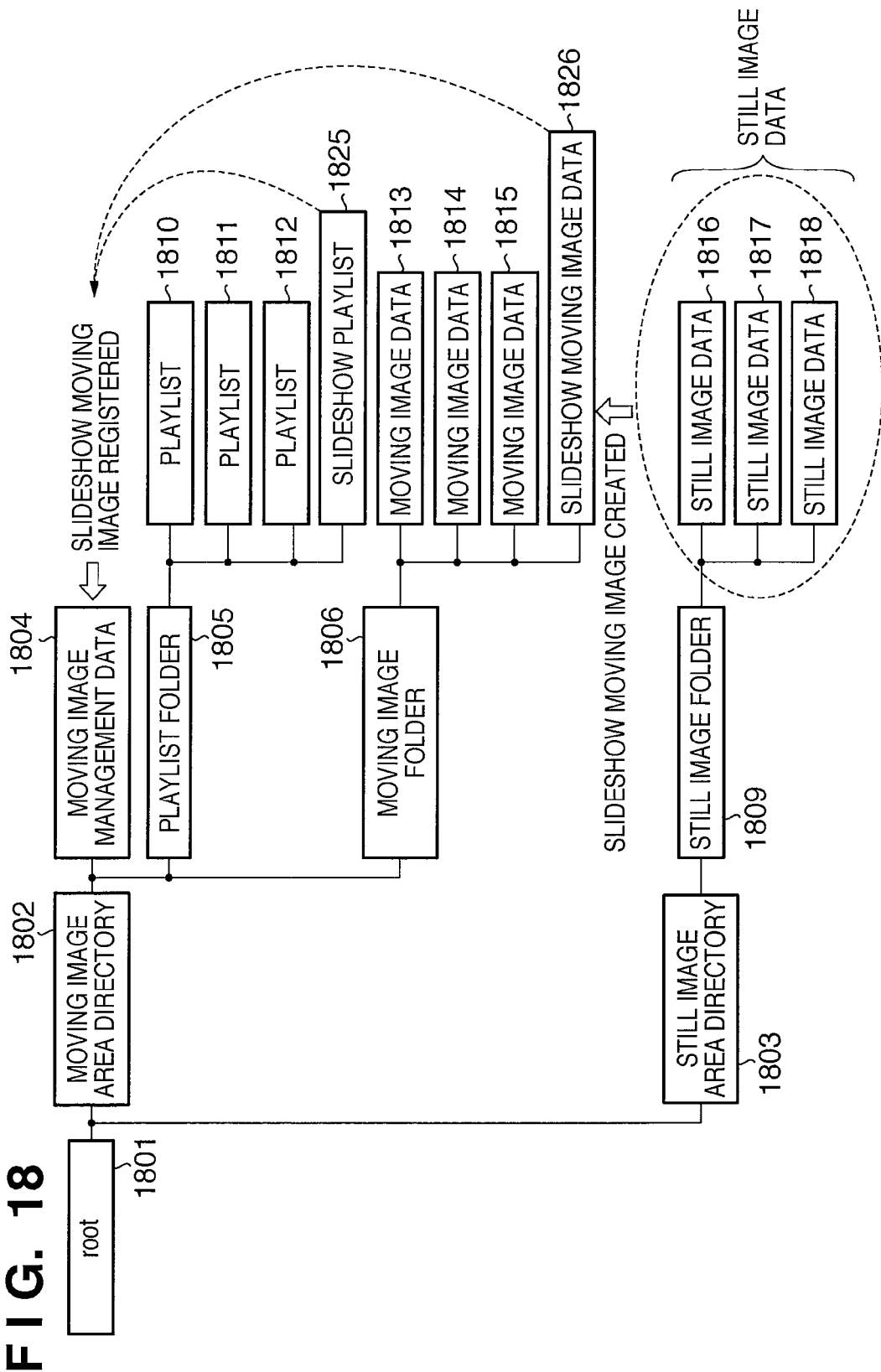
FIG. 18 is a diagram illustrating an example of the file directory structure of a recording medium onto which a slideshow moving image described with reference to FIG. 17 is recorded.

FIG. 16 is a flowchart illustrating the flow of a process for generating the reproducing program according to Variation 5. In FIG. 16, steps that perform processes identical to those in FIG. 4 are given identical reference numerals, and descriptions thereof shall be omitted.

In S1601, the video camera 1515 transfers moving image-related data to the PC 1516, and records the data onto the recording medium 107.

In S1602, the video camera 1515 determines whether or not still image data is present in the recording medium 1507. The process moves to S404 in the case where still image data is present, and ends in the case where no still image data is present.

In S1603, the video camera 1515 transfers the still image data that is to be reproduced and that is within the recording medium 107 to the PC 1516. The transferred still image data is stored in the application data folder 208 of the recording medium 107.

The processes that follow are the same as those in the first embodiment; the PC 1516 generates the reproducing program 319 based on the transferred still image data.

The file directory structure of the recording medium 107 following the execution of the process for generating the reproducing program 319 is the same as that shown in FIG. 6, and thus descriptions thereof shall be omitted.

As described thus far, according to the present embodiment, the still image data to be reproduced is transferred from the second recording medium to the first recording medium. The information processing apparatus generates the reproducing program based on the transferred still image data, and records the reproducing program in the moving image area directory or the still image area directory of the first recording medium.

Accordingly, it is possible to efficiently generate a reproduction application that can be executed by an image reproducing apparatus when transferring data captured by a video camera that uses, for example, a solid-state memory as its recording medium to a disc medium used for storage.

Other Embodiments

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a Floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-264968, filed on Oct. 10, 2007, which is hereby incorporated by reference herein in its entirety.

What is claimed is:

1. A recording apparatus having a hardware processor, comprising:
   a recording unit configured to generate a first directory and a second directory on a recording medium and records data on the recording medium, the recording unit storing image data in the second directory; and
   an application generation unit configured to generate, for an image reproducing apparatus that is different from the recording apparatus, an application program that is executable by the image reproducing apparatus different from the recording apparatus,
   the image reproducing apparatus different from the recording apparatus operating under a basic program that is capable of reading data stored in the first directory of the recording medium but that is incapable of reading the image data that is stored in the second directory of the recording medium,
   the application generation unit generating a reproducing application for the image reproducing apparatus different from the recording apparatus to read the image data stored in the second directory of the recording medium, as an application program executable by the image reproducing apparatus different from the recording apparatus,
   wherein the recording unit stores the application program generated by the application generation unit in the first directory of the recording medium on which the second directory storing the image data is generated such that the image reproducing apparatus different from the recording apparatus reads the image data stored in the second directory of the recording medium in accordance with the application program stored in the first directory of the recording medium, and
   wherein at least one of the recording unit and the application generation unit is implemented by the hardware processor.

2. The recording apparatus according to claim 1, wherein the application generation unit generates the reproducing application including an instruction that causes the image reproducing apparatus to obtain the image data stored in the second directory.

3. The recording apparatus according to claim 1, further comprising:
   an obtaining unit configured to obtain the image data stored in the second directory,
   wherein the recording unit stores the image data obtained by the obtaining unit into the first directory; and
   the application generation unit generates the reproducing application including an instruction that causes the image reproducing apparatus to obtain the image data stored in the first directory.

4. The recording apparatus according to claim 1, further comprising:
   an obtaining unit configured to obtain the image data stored in the second directory,
   wherein the application generation unit generates the reproducing application including the image data obtained by the obtaining unit.

5. The recording apparatus according to claim 1, wherein the recording unit stores link data toward to the image data stored in the second directory into the first directory.

6. The recording apparatus according to claim 1, further comprising:
   a thumbnail generation unit configured to generate thumbnail data of the image data stored in the second directory,
   wherein the recording unit stores the thumbnail data generated by the thumbnail generation unit into the first directory; and
   the application generation unit generates the reproducing application including an instruction that causes the image reproducing apparatus to obtain the thumbnail data stored in the first directory.

7. The recording apparatus according to claim 1, further comprising:
   a thumbnail generation unit configured to generate thumbnail data of the image data stored in the second directory,
   wherein the application generation unit generates the reproducing application including the thumbnail data generated by the thumbnail generation unit.

8. The recording apparatus according to claim 1, wherein the memory stores a template program for the application program, and the application generation unit generates the reproducing application by adding to the template program information designating the image data stored in the second directory.

9. The recording apparatus according to claim 1, wherein the image reproducing apparatus is a Blu-ray disc player;
   the application generation unit generates the reproducing application using a Java language; and
   the recording unit stores the reproducing application into the first directory according to a Blu-ray Disc Java standard.

10. The recording apparatus according to claim 9, wherein the image data stored in the second directory of the recording medium is stored according to the Design Rule for Camera File System standard.

11. The recording apparatus according to claim 1, wherein the recording unit stores moving image data into the first directory and stores still image data into the second directory; and
   the basic program is a program causing the image reproducing apparatus to read the moving image data stored in the first directory.

12. A control method for a recording apparatus having a system controller configured to control the recording apparatus and a memory, comprising steps of:
   generating a first directory and a second directory on a recording medium and recording data on the recording medium, the recording step storing image data in the second directory; and
   generating, for an image reproducing apparatus that is different from the recording apparatus, an application program that is executable by the image reproducing apparatus different from the recording apparatus, the image reproducing apparatus different from the recording apparatus operating under a basic program that is capable of reading data stored in the first directory of the recording medium but that is incapable of reading the image data that is stored in the second directory of the recording medium, said step of generating an application program generating a reproducing application for the image reproducing apparatus different from the recording apparatus to read the image data stored in the second directory of the recording medium, as an application program executable by the image reproducing apparatus different from the recording apparatus, wherein the recording step stores the application program generated in said step of generating an application program in the first directory of the recording medium on which the second directory storing the image data is generated such that the image reproducing apparatus different from the recording apparatus reads the image data stored in the second directory of the recording medium in accordance with the application program stored in the first directory of the recording medium.

13. A non-transitory computer-readable storage medium on which a computer program is stored, the program causing a recording apparatus having a system controller configured to control the recording apparatus and a memory to function as:

a recording unit configured to generate a first directory and a second directory on a recording medium and records data on the recording medium, the recording unit storing image data in the second directory; and an application generation unit configured to generate, for an image reproducing apparatus that is different from the recording apparatus, an application program that is executable by the image reproducing apparatus different from the recording apparatus, the image reproducing apparatus different from the recording apparatus operating under a basic program that is capable of reading data stored in the first directory of the recording medium but that is incapable of reading the image data that is stored in the second directory of the recording medium, the application generation unit generating a reproducing application for the image reproducing apparatus different from the recording apparatus to read the image data stored in the second directory of the recording medium, as an application program executable by the image reproducing apparatus different from the recording apparatus, wherein the recording unit stores the application program generated by the application generation unit in the first directory of the recording medium on which the second directory storing the image data is generated such that the image reproducing apparatus different from the recording apparatus reads the image data stored in the second directory of the recording medium in accordance with the application program stored in the first directory of the recording medium.

* * * * *